(12) United States Patent
Nilsson

(10) Patent No.: US 11,118,324 B2
(45) Date of Patent: Sep. 14, 2021

(54) MULTI-BACKHOE LINKAGE MECHANISM

(71) Applicant: COGNIBOTICS AB, Lund (SE)

(72) Inventor: Adam Nilsson, Brooklyn, NY (US)

(73) Assignee: Cognibotics AB, Lund (SE)

( * ) Notice: Subject to any disclaimer, the term of this patent is extended or adjusted under 35 U.S.C. 154(b) by 0 days.

(21) Appl. No.: 16/875,171

(22) Filed: May 15, 2020

(65) Prior Publication Data

US 2020/0370275 A1    Nov. 26, 2020

Related U.S. Application Data

(63) Continuation-in-part of application No. 16/418,913, filed on May 21, 2019, now abandoned.

(30) Foreign Application Priority Data

Jun. 20, 2019    (JP) ................................. 2019-114391

(51) Int. Cl.
     *E02F 3/42*      (2006.01)
     *E02F 3/30*      (2006.01)
     (Continued)

(52) U.S. Cl.
     CPC ............. *E02F 3/425* (2013.01); *B25J 9/0045* (2013.01); *B25J 17/0266* (2013.01); *E02F 3/302* (2013.01); *E02F 3/32* (2013.01)

(58) Field of Classification Search
None
See application file for complete search history.

(56) References Cited

U.S. PATENT DOCUMENTS 2,678,741 A    5/1954   Pilch
2,698,697 A    1/1955   Holopainen
(Continued)

FOREIGN PATENT DOCUMENTS

CN      106759569      5/2017
DE      2005010579    * 3/2005  ............. E05F 15/04
(Continued)

OTHER PUBLICATIONS

Yanhuo Zou, Automatic Topological Structural Synthesis Algorithm of Planar Simple Joint Kinematic Chains, 2016, Advances in Mechanical Engineering, vol. 8(3), 1-12 (Year: 2016).*
(Continued)

*Primary Examiner* — Ronald P Jarrett
(74) *Attorney, Agent, or Firm* — Klein, O'Neill & Singh, LLP

(57) ABSTRACT

A multi-backhoe linkage mechanism, operable for rotating an output link around an output axis of rotation of an output joint at a base, includes a first closed kinematic chain, including the output link, a connecting link, and an input link. The output link is connected via the output joint to the base and via a connecting joint to the connecting link. The connecting link is connected via a bridging joint to the input link. The first closed kinematic chain additionally includes a base link connected to the base and to the input link. One or more additional closed kinematic chains are connected in a series after the first closed kinematic chain. Each additional closed kinematic chain is connected to the previous closed kinematic chain such that actuation of the additional closed kinematic chain amplifies the angle of rotation of the output link around the output axis of rotation.

21 Claims, 13 Drawing Sheets

(51) Int. Cl.
    *B25J 17/02*   (2006.01)
    *B25J 9/00*    (2006.01)
    *E02F 3/32*    (2006.01)

(56) References Cited

U.S. PATENT DOCUMENTS

| | | | | |
|---|---|---|---|---|
| 3,703,968 A | * | 11/1972 | Uhrich | B25J 9/1065 |
| | | | | 414/680 |
| 3,850,307 A | * | 11/1974 | Motoda | F16M 11/2092 |
| | | | | 212/237 |
| 3,995,746 A | * | 12/1976 | Usagida | B66C 23/10 |
| | | | | 414/738 |
| 4,364,705 A | | 12/1982 | Shumaker | |
| 4,638,680 A | * | 1/1987 | Albrecht | E02F 3/3604 |
| | | | | 74/104 |
| 5,486,084 A | * | 1/1996 | Pitman | B60P 1/5433 |
| | | | | 188/171 |
| 5,592,762 A | | 1/1997 | Hendron et al. | |
| 8,474,161 B2 | | 7/2013 | Cunningham | |
| 2020/0262056 A1 | * | 8/2020 | Riegger | B25J 9/106 |

FOREIGN PATENT DOCUMENTS

| | | |
|---|---|---|
| DE | 102005010579 | 4/2006 |
| EP | 1477614 | 11/2004 |
| EP | 1566488 | 8/2005 |
| WO | WO2014/187486 | 11/2014 |

OTHER PUBLICATIONS

International Search Report and Written Opinion on corresponding PCT application (PCT/EP2020/063573) from International Searching Authority (EPO) dated Sep. 15, 2020.
Zou et al.; "Automatic topological structural synthesis algorithm of planar simple joint kinematic chains"; Advances in Mechanical Engineering; Feb. 2016; vol. 8(3); 12 pages.

* cited by examiner

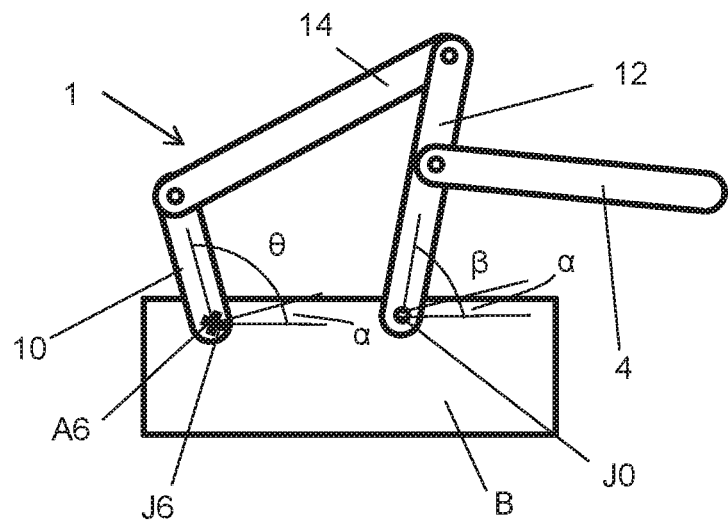
Fig. 1
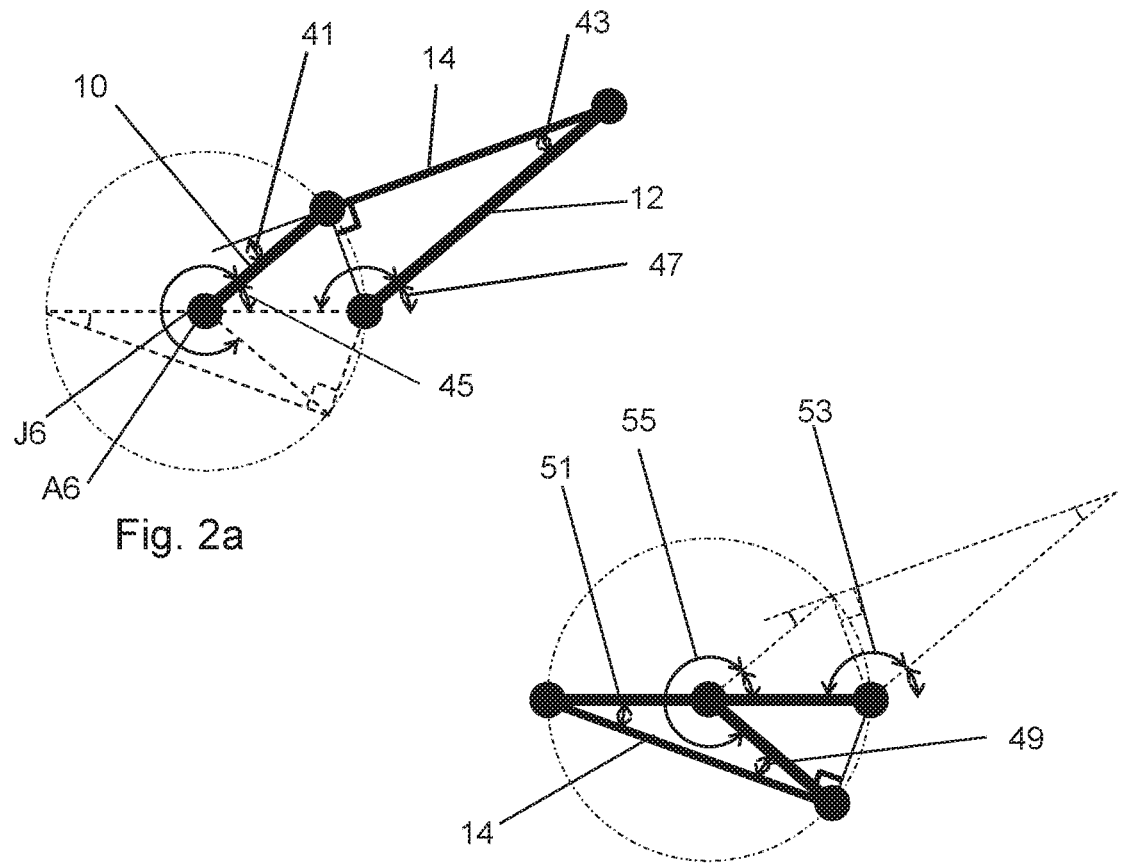
Fig. 2a
Fig. 2b

MULTI-BACKHOE LINKAGE MECHANISM

CROSS-REFERENCE TO RELATED APPLICATION

This application is a Continuation-in-Part of co-pending U.S. application Ser. No. 16/418,913, filed May 21, 2019, the disclosure of which is incorporated by reference in its entirety.

FEDERALLY SPONSORED RESEARCH OR DEVELOPMENT

Not applicable.

BACKGROUND

The present disclosure relates to the technical field of linkage mechanisms to achieve large rotating motions.

Construction equipment, and excavators in particular, have been the pioneers for design of linkage mechanisms to achieve large working-range rotating motions. U.S. Pat. No. 2,698,697 disclosed, in 1948, an apparatus for attaching a power-operated shovel to the back of a tractor. This was the starting point for a new field of technical development, which today is still ongoing. The power-operated shovel could be operated from the tractor at the base of the arm, but the rotation of the shovel was limited.

In U.S. Pat. No. 2,678,741, an example is described of using a four-bar linkage to achieve a larger range of rotation on an excavator backhoe shovel, enabling it to both dig and dump material. In U.S. Pat. No. 5,592,762 describes a further improvement, i.e., attaching the actuating rod to a ternary connecting link. This gives an additional range of motion, as the connection point is moved outwards during forward motion.

In EP1477614A1, it is described how to make use of a connecting link with a length adjustable by a hydraulic cylinder to achieve a larger range of rotation. However, such mechanism requires an additional actuator to control the length of the connecting link.

SUMMARY

The challenge of achieving larger range of rotation for industrial robots has traditionally been solved using motors located close to the end of the robot arm, for rotating a tool via a gearbox or via some gearing transmission, such as a ball-screw. With new robotics structures, such as the hybrid kinematic structure presented in WO2014187486, there is a foreseen need for wrist mechanisms with minimal moving and supported mass.

In automation, and generally in machines, the most common way of achieving a different (lower or higher, depending on machinery) amount of rotation in an output shaft compared to the rotation of an input shaft is to use a gear transmission comprising tooth-wheels arranged in a gearbox. Such a gear transmission has the potential advantage that the amount of rotation is unlimited. There are, however, also disadvantages, such as deficient torque transfer compared to the weight of the gear transmission. For instance, a gear transmission to achieve a ratio of 1:2 between input and output may comprise two gear wheels of 20 and 40 teeth respectively. While only a few of these teeth may carry a load at the same time, all the teeth (and the part of the wheel holding them) still contribute to a comparably high total weight. Another disadvantage, which in the end results in increased weight along with other non-desired properties such as higher cost, is the fact that gear teeth in contact expose each other to a scuffing motion which will wear down the surface or demand special costly surface treatments. Furthermore, when the surfaces of the teeth are worn out, the complete gear typically must be replaced.

It is thus an object of the disclosure to alleviate at least some of the drawbacks with the prior art. It is a further object to provide a mechanism that can provide a large range of rotation in a confined space. It is another object to provide a mechanism that has a low weight compared to gear transmissions, and to provide transmissions in which any friction and wear are localized in machine elements (such as bushings) that can be replaced as part of a simpler service procedure.

These objects and others are at least partly achieved by backhoe linkage mechanisms according to the embodiments disclosed herein and their equivalents.

According to a first aspect, the disclosure relates to a backhoe linkage mechanism for rotating an output link around an output axis of rotation of an output joint at a base. The backhoe linkage mechanism comprises a first closed kinematic chain that includes the output link, a connecting link, and an input link. The output link is connected via the output joint to the base, and is connected via a connecting joint to the connecting link, and the connecting link is connected via a bridging joint to the input link. The first closed kinematic chain additionally includes a base link connected via a base joint to the base and connected via an input joint to the input link. The backhoe linkage mechanism also comprises one or more additional closed kinematic chains connected successively in series after the first closed kinematic chain. Each additional closed kinematic chain includes a base link of the previous closed kinematic chain, the input link of the previous closed kinematic chain, an additional connecting link connected to the previous closed kinematic chain, an additional input link, and a kinematic connection between the closed kinematic chain and the previous serially connected closed kinematic chain. The additional connecting link and the kinematic connection are connected to the previous closed kinematic chain such that actuation of the additional closed kinematic chain amplifies the angle of rotation of the output link around the output axis of rotation.

The backhoe linkage mechanism accomplishes an amplification of the angle of rotation of the output link in relation to an input angle of the actuation, such that a large range of rotation is possible with a smaller limited input angle. Depending on specific physical arrangements for a machine at hand for an application, a rotation of an input or output link is equivalent to rotation of a shaft connected to the machine. Likewise, the mechanism can be actuated from a comparably large distance, by using a rod or similar element, and there is thus no need to have an actuator close to the mechanism, whereby the need for cabling and an actuator that adds weight close to the application is avoided. Also, the mechanism does not rotate over the output axis of rotation as in many prior art linkages. Instead, the mechanism rotates with the effect of a backhoe linkage, and thus the backhoe linkage mechanism rotates around the output axis of rotation with no part crossing the output axis of rotation during the actuation. Thereby the backhoe linkage mechanism is convenient where space is limited. It also provides a useful solution where moving mass is an issue, such as in actuation of robot wrist motions. Thus, in many cases when gearing is not required to operate over indefinite angles, such as in most motions of robot axes, the backhoe linkage mechanism is a viable alternative to transmissions based on gears. As for gears, but not until now for backhoe mechanisms, the disclosed backhoe mechanism enables compact and efficient arrangements into multiple stages, and hence it can (opposed to prior art) be referred to as a multi-backhoe mechanism.

According to some embodiments, each additional closed kinematic chain includes an additional base link, except for the last additional closed kinematic chain in the series. By having the additional base link(s), the previous connection point of the whole previous input linkage to the base can be rotated and thereby the angle of rotation of output link can be increased.

According to some embodiments, the additional base link is connected via an additional input joint to the additional input link of the same additional closed kinematic chain, and via a base joint to the base. Thereby the whole previous input linkage can be rotated.

According to some embodiments, the additional connecting link and the kinematic connection of the same additional closed kinematic chain are connected to the previous closed kinematic chain to rotate the base link around the output axis of rotation and to rotate the input link with respect to the base link, of the previous closed kinematic chain. Thereby the additional closed kinematic chain can amplify the angle of rotation of the output link to a large degree.

According to some embodiments, the one or several additional closed kinematic chains are arranged to rotate the base link and the input link with respect to the base link, such that the total angle of rotation of the output link is determined by the combined rotation of the base link and the rotation of the output link relative the base link. Thus, both the rotation of the base link and the rotation of the output link relative the base link are effective in increasing the rotation of the output link.

According to some embodiments, the kinematic connection comprises a link. Thus, the kinematic connection comprises at least one mechanical part. By varying the material of the mechanical part, such as selecting a compliant material, the mechanism can be given different properties.

According to some embodiments, the kinematic connection is arranged between the base link of the previous serially connected closed kinematic chain, and one of the input link, the additional connecting link, and the additional connecting link of the subsequent serially connected closed kinematic chain. Alternatively, the kinematic connection is arranged between the input link of the previous serially connected closed kinematic chain, and one of the input link, and the additional connecting link of the subsequent serially connected closed kinematic chain. Thus, a plurality of alternative connections is feasible to provide greater flexibility in designing the surrounding machine.

According to some embodiments, the link of the kinematic connection is connected via linking joints to the respective links. A connection via joints entails that the connection can be made with standard machine elements, resulting in an effective and low-cost mechanism.

According to some embodiments, at least one of the input links of the one or more additional closed kinematic chains is connected via an input joint to the base. Thereby an enclosed mechanism is accomplished.

According to some embodiments, the input link of the last one of the one or more additional closed kinematic chains in the series is connected via an input joint to the base. As only the last input link of the one of the additional closed kinematic chains is connected to the base, the other ones are free to move and amplify the angle of rotation of the output link.

According to some embodiments, the base joint that connects the base link to the base has an axis of rotation that coincides with the output axis of rotation. Thereby the mechanism needs less space.

According to some embodiments, all axes of rotation of the joints are parallel. Thereby an intuitive design is accomplished that is simple to integrate with other mechanisms.

According to some embodiments, a distance between an axis of rotation of the output joint and an axis of rotation of the connecting joint that connects the output link or input link to the connecting link is smaller than a distance between an axis of rotation of the input joint that connects the input link to one of the base and the base link, and the axis of rotation of the bridging joint that connects the connecting link to the input link, of the same closed kinematic chain. Thereby an effective amplification is enabled.

According to some embodiments, for each additional closed kinematic chain the additional connecting link is connected via a connecting joint to one of the input link and the connecting link of the previous closed kinematic chain; and the additional input link is connected via a bridging joint to the additional connecting link. Thereby the kinematics of the mechanism can be derived as explicit equations. For example, gearing ratio functions that can be efficiently evaluated within the machine control may be formulated.

According to some embodiments, a distance between an axis of rotation of the linking joint connecting the kinematic connection to the previous closed kinematic chain, and an axis of rotation of the additional linking joint connecting the kinematic connection to the additional closed kinematic chain, is shorter than the distance between the axis of rotation of the additional linking joint connecting the kinematic connection to the additional closed kinematic chain, and an axis of rotation of the bridging joint connecting the additional connecting link to the additional input link of the same additional closed kinematic chain. Thereby a desired amplification can be achieved.

According to some embodiments, a distance between an axis of rotation of the input joint that connects the input link to one of the base and to the base link, and an axis of rotation of the connecting joint that connects the output link or the input link to the connecting link, is shorter than the distance between an axis of rotation of the additional linking joint connecting the kinematic connection to the additional closed kinematic chain, and an axis of rotation of the bridging joint that connects the connecting link to the input link of the same additional closed kinematic chain. Thereby a desired amplification can be achieved.

According to some embodiments, the output link and the input link of the first closed kinematic chain are arranged to rotate relative to the base link of the first closed kinematic chain. Thereby a desired amplification can be achieved.

According to some embodiments, the first kinematic chain comprises a first extension input link connected between the connecting link and the base link, and a second extension input link connected between the first extension input link and the input link. Thereby the mechanism can be made smaller but with maintained rotational amplification degree.

According to some embodiments, one or more of the additional closed kinematic chains each comprises a first extension additional input link connected between the kinematic connection and the connecting link, and a second extension additional input link connected between the first extension additional input link and the additional input link. Thereby the mechanism can be made smaller but with maintained rotational amplification degree.

According to a second aspect, the disclosure relates to an apparatus for rotating an output link around an output axis of rotation of an output joint at a base comprising: a backhoe linkage mechanism according to the first aspect and optionally according to any of the embodiments as disclosed herein, and an actuating mechanism arranged to actuate the backhoe linkage mechanism.

More specifically, according to the second aspect, the apparatus comprises a backhoe linkage mechanism that comprises a first closed kinematic chain that includes the output link, a connecting link, and an input link, wherein the output link is connected via the output joint to the base and is connected via a connecting joint to the connecting link; and wherein the connecting link is connected via a bridging joint to the input link; and wherein the first closed kinematic chain further includes a base link connected via a base joint to the base, and connected via an input joint to the input link; wherein the backhoe linkage mechanism further comprises one or more additional closed kinematic chains connected successively in a series after the first closed kinematic chain, each additional closed kinematic chain including: a base link of a previous closed kinematic chain; an input link of the previous closed kinematic chain; an additional connecting link connected to the previous closed kinematic chain; an additional input link; and a kinematic connection between the closed kinematic chain and the previous closed kinematic chain; wherein the additional connecting link and the kinematic connection are connected to the previous closed kinematic chain such that actuation of the additional closed kinematic chain amplifies an angle of rotation of the output link around the output axis of rotation; and wherein the apparatus further comprises an actuating mechanism arranged to actuate the backhoe linkage mechanism.

In embodiments of this aspect, the actuating mechanism may comprise a rod connected to a link of the one or more additional closed kinematic chains, wherein the backhoe linkage mechanism is arranged to be actuated by a force F in the direction of the rod. The backhoe linkage mechanism according to this aspect may be in accordance with any of the above-described embodiments.

According to a third aspect, the disclosure relates to a robot comprising an apparatus according to the second aspect and optionally according to any of the embodiments as disclosed herein, wherein the rotation of the output link is used for orientating a tool of a robot, whereby robot wrists can be built without motors embedded in the wrists.

More specifically, in accordance with this aspect, a robot comprises an apparatus for rotating an output link around an output axis of rotation of an output joint at a base, the apparatus comprising a backhoe linkage mechanism, wherein the backhoe linkage mechanism comprises a first closed kinematic chain that comprises the output link, a connecting link, and an input link; wherein the output link is connected via the output joint to the base, and is connected via a connecting joint to the connecting link; and wherein the connecting link is connected via a bridging joint to the input link; and wherein the first closed kinematic chain further includes a base link connected via a base joint to the base, and connected via an input joint to the input link; wherein the backhoe linkage mechanism further comprises one or more additional closed kinematic chains connected successively in a series after the first closed kinematic chain, each additional closed kinematic chain including a base link of a previous closed kinematic chain; an input link of the previous closed kinematic chain; an additional connecting link connected to the previous closed kinematic chain; an additional input link; and a kinematic connection between the closed kinematic chain and the previous closed kinematic chain; wherein the additional connecting link and the kinematic connection are connected to the previous closed kinematic chain such that actuation of the additional closed kinematic chain amplifies an angle of rotation of the output link around the output axis of rotation; wherein the apparatus further comprises an actuating mechanism arranged to actuate the backhoe linkage mechanism, and wherein the rotation of the output link is used for orientating a tool of the robot.

According to some embodiments, the actuating mechanism comprises a rod connected to a link of the one or more additional closed kinematic chains, wherein the backhoe linkage mechanism is arranged to be actuated by a force F in the direction of the rod. A pushing and pulling rod can thereby be used to achieve rotations of more than one full turn.

The backhoe linkage mechanism according to this aspect may be in accordance with any of the above-described embodiments.

In this disclosure a multiple of different embodiments are described that also can be combined. It should thus be understood that these embodiments, and aspects and/or features of these embodiments may be combined to create other embodiments than the ones explicitly described. Any combination of embodiments, aspects and/or features of the embodiments, aspects and/features described herein, is thus considered to be included in this disclosure.

BRIEF DESCRIPTION OF THE DRAWINGS

FIG. 1 illustrates a prior art basic four-bar linkage.

FIGS. 2a and 2b schematically illustrate the prior art basic four-bar linkage geometry of FIG. 1 in its most backward and forward positions.

DETAILED DESCRIPTION

Figure 3A:
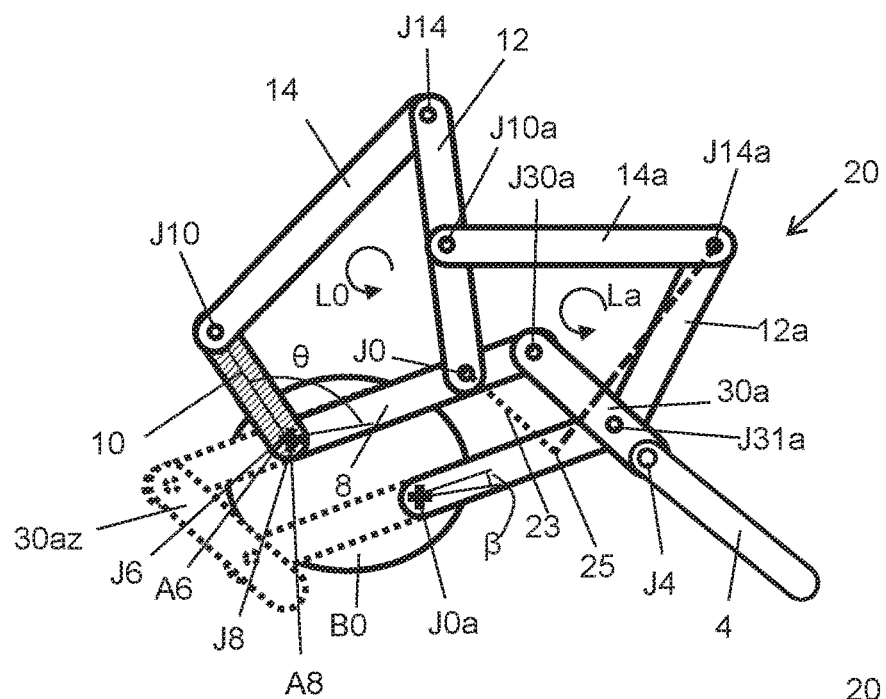
FIG. 3a illustrates a backhoe linkage mechanism comprising an input linkage, according to one embodiment of this disclosure.

A backhoe linkage is herein defined to be a plurality of links connected by joints that are arranged such that they can be actuated to create a motion of a backhoe as known from excavators, i.e., a rotating ingoing and respective outgoing motion with a gearing relation. Ingoing and outgoing, or equivalently input and output, respectively, refer to typical usage from an actuation point of view, whereas the linkage, as such, can be physically operated in the opposite direction. A multi-backhoe linkage in accordance with this disclosure comprises a plurality of single backhoe linkages, where each single backhoe linkage adds an amplification to the angle of rotation of the output link. A multi-backhoe linkage may also be referred to as multi-link backhoe linkage.

A linkage mechanism is herein defined to be an arrangement or device that is designed to bridge components of an apparatus, system, or equivalent.

A link is herein defined to be a mechanical part of a linkage, connecting adjacent parts via joints. A link, as such, can be elastic, or it can be designed to have a variable stiffness, or it can be designed to have elastic and stiff modes depending on the selected mode of operation, or it can be considered to be a rigid body as in a mechanism design based on analysis of kinematic chains. For brevity of the following description, a link is assumed to be a rigid body. A link may include various structures, for example a circular structure, such as a ring-shaped structure. A synonym to ring-shaped structure is here annular structure. A link may also be referred to as a shaft in some embodiments.

A joint is herein defined to be designed to connect a link with another link or structure, such that motion in at least one degree of freedom is allowed.

The following describes embodiments of a backhoe linkage mechanism that has the capability of achieving large range of rotations. The backhoe linkage mechanism connects a first closed kinematic chain in series with one or more additional closed kinematic chains, and thereby enables a great range of rotation in a new way compared to previously known mechanisms. An outgoing link or axis of the first closed kinematic chain may achieve a range of rotation greater than 360 degrees, by the means of actuation coming from a push-pull motion.

The backhoe linkage mechanism according to aspects of this disclosure has a construction such that, when the mechanism is actuated, the output link of the first closed kinematic chain is rotated at the same time as the whole backhoe linkage mechanism is rotated, where the rotations are accomplished by the same actuator. Multiple additional closed kinematic chains can be connected in a sequence, making limitless rotation of an output link possible. This makes the backhoe linkage mechanism a viable alternative to transmissions based on gears. A linkage mechanism that transmits rotation from an input link (the last input link in the series) to an output link via a set of joints has the advantage over a gearbox in that loads are distributed through all the components, enabling a relatively lighter assembly. This is in comparison with a gear transmission, where only a few teeth are loaded at the same time, while the rest of the gear teeth are still accounting for the total mass of the transmission. The backhoe linkage mechanism in accordance with aspects of this disclosure may be connected with pivot joints, or alternatively connected by the means of roller bearings, plain bearings or bushings, which increases the component life by reducing friction and wear, while using components that can also easily be replaced when worn out, while all the major components (such as the links) can be reused with minimal service needs. This is in comparison with gear transmissions, where the whole transmission may need to be replaced as a result of excessive wear.

The herein disclosed backhoe linkage mechanisms not only have the capability of increasing the range of rotation for a closed kinematic chain, but they may also limit the contact angle between an actuating rod and links of the backhoe linkage mechanism without sacrificing the range of rotation. This in turn limits the forces that the links of the backhoe linkage mechanism have to be dimensioned for, which opens up possibilities for heavy machinery and construction equipment. The disclosed backhoe linkage mechanisms may be actuated by a rod pushing on any link other than the output link. However, the rod may be replaced by a rotating shaft attached to any of the links (except the output link), as long as the link does not have a constant orientation at all positions of the linkage. Such a shaft may be arranged to rotate concentric to the output link as well as eccentric or even around a non-parallel axis.

FIG. 1 illustrates a four-bar linkage 1 known from the prior art, arranged to rotate an output link 10 relative to a base B around an output axis of rotation A6 by the means of an input link 12 and a connecting link 14. The output link 10 is connected to the base B by means of an output joint J6. The input link 12 is connected to the base B by means of an input joint J0 with an axis of rotation different from the output axis of rotation A6. The base B is here seen as the fourth bar of the four-bar linkage 1. A torque is applied around input joint J0 either by means of a force F in relation to the base B, or by a torque T acting at input joint J0, for instance by means of a rotating shaft mounted to the input link 12 at input joint J0. An actuating rod 4 may be connected at different locations such as to either input link 12 or to connecting link 14 in order to transmit a force F from an actuator to the linkage. Generally, an angle between a link and the line of action of a force acting on the link must be greater than zero in order for the acting force to achieve a rotating effect on the four-bar linkage 1. A minimum angle is here referred to as α. To minimize the forces in the links for practical applications, an angle larger than α should be maintained between the link and the line of action. Generally, the location of the joints and the lengths of the links are designed to obtain a maximum amplification of the output angle θ relative to the input angle β. The input angle β is, in FIG. 1, an angle of rotation of the input link 12, and the output angle θ is the corresponding angle of rotation of the output link 10.

FIG. 2a schematically illustrates the prior art basic four-bar linkage of FIG. 1 in its most backward position, for one value of the minimum angle α, and FIG. 2b schematically illustrates the prior art basic four-bar linkage of FIG. 1 in its most forward position. The most backward position is given by the angle α, where the angles 41, 43 and 47 are equal to α. In a preferred arrangement, the most forward position is also given by the angle α, where the angles 49 and 51 are all equal to α, and the input link 12 of the four-bar linkage is given an effective length of two times the length of the effective length of the output link 10. This gives a minimum angle α for a maximized rotation range while maximum forces are bounded. Furthermore, in a preferred arrangement, the four-bar linkage is pivotally attached to the base B at a distance from the output axis of rotation A6 that is equal to the effective length of the output link 10 (a length of a link between two of its joints may be referred to as the "effective length" of the link). The connecting link 14 between the output link 10 and the input link 12 has a length equal to the length of the input link 12 times the cosine of angle α. For this arrangement, the skilled person can observe that when the angle 41 between the output link 10 and connecting link 14 is equal to α, the angle 43 between the input link 12 and connecting link 14 is equal to α, the angle 45 between the output link 10 and base link 8 is two times α, and the angle 47 between the input link 12 and the base link 8 is two times α. When the output link 10 is rotated forward to the maximum allowed position as illustrated in FIG. 2b, the angle 49 between the output link 10 and the connecting link 14 is α. Then the angle 53 between the input link 12 in its most backward position and its most forward position is 180 degrees minus two times α, and the angle 55 between the output link 10 in its most backward position and its forward position is 360 degrees minus four times α. The embodiment in FIGS. 2a and 2b is shown with α equal to 20 degrees. By decreasing a to a value close to zero, the range of rotation of the output link 10 would become close to 360 degrees, but with very large forces in the links at the end positions.

In the following a plurality of different embodiments of a backhoe linkage mechanism in accordance with aspects of this disclosure will be described. The backhoe linkage mechanism is related to the prior art four-bar linkage described in FIGS. 1-2b, and the same references as in these figures will be used for similar features in the following figures. Generally, the backhoe linkage mechanism amplifies an input angle β such that a larger output angle θ is achieved. In other words, the output angle θ is amplified relative to the input angle β. Of course, as for any gearing machine element that is not self-locking, the opposite direction of operation can be applied when a reduction of the output angle is desirable.

The following plurality of different embodiments may include varying numbers of additional closed kinematic chains. Based on the number of additional closed kinematic chains, the input angle β may be defined differently. According to one embodiment, the input angle β is defined to be the angle of rotation of the input link of the last additional closed kinematic chain. The output angle θ is the angle of rotation of the output link 10. The input angle β and the output angle θ are given regardless of, i.e. without, the minimum angle α.

FIG. 3a illustrates a backhoe linkage mechanism according to one embodiment. The backhoe linkage mechanism is effective for rotating the output link 10 around an output axis of rotation A6 of an output joint J6 at a base B0. The output link 10 is in FIG. 3a hatched such that it can be immediately recognized. The backhoe linkage mechanism comprises a first closed kinematic chain L0. The first closed kinematic chain L0 includes the output link 10, a connecting link 14, and an input link 12. The output link 10 is connected via the output joint J6 to the base B0 and connected via a connecting joint J10 to the connecting link 14. The connecting link 14 is connected via a bridging joint J14 to the input link 12 of L0. The first closed kinematic chain L0 also includes a base link 8 connected via a base joint J8 to the base B0 and connected via the input joint J0 to the input link 12. Here, in this figure, the axis of rotation A8 of the base joint J8 coincides with the output axis of rotation A6. In an alternative embodiment (not shown), the base joint J8 has another location on the base B0, and its axis of rotation A8 does not coincide with output axis of rotation A6. As can be understood from the embodiment in FIG. 3a, the distance between output joint J6 and connecting joint J10 is smaller than the distance between input joint J0 and bridging joint J14. Also, the distance between output joint J6 and input joint J0 is smaller than the distance between connecting joint J10 and bridging joint J14. The distance between joints is the distance between axes of rotation of the joints. For planar mechanisms that distance is trivial, while for the three-dimensional (3D) case it refers to the distance between the center of the joints, such as the sphere center for a spherical joint or axes intersection for cardan joints. The links and joints of the first closed kinematic chain L0 are herein also referred to as the output linkage.

The backhoe linkage mechanism also comprises an additional closed kinematic chain connected successively in series with, and after (seen from the output side), the first closed kinematic chain L0. The additional closed kinematic chain is here referred to as a first additional closed kinematic chain La. The first additional closed kinematic chain La is thus connected directly in series after the first closed kinematic chain L0. The first additional closed kinematic chain La includes the base link 8 of the previous serially connected closed kinematic chain, here the first closed kinematic chain L0. The first additional closed kinematic chain La also includes the input link 12 of the first kinematic chain L0, and a first additional input link 12a. The first additional closed kinematic chain La also includes a first additional connecting link 14a that is connected to the first closed kinematic chain L0. The first additional closed kinematic chain La further includes a first kinematic connection 30a between the first additional closed kinematic chain La and the first closed kinematic chain L0. The first kinematic connection 30a here comprises a link. The link is connected to the base link 8 with a linking joint J30a, and to the first additional input link 12a with an additional linking joint J31a. The input joint J0 is here located between the linking joint J30a and the base joint J8. The first additional connecting link 14a is connected via a connecting joint J10a to the input link 12, here approximately midway between the bridging joint J14 and the input joint J0. In an alternative embodiment (not shown), the first additional connecting link 14a is connected to the connecting link 14. The first additional input link 12a is connected via a bridging joint J14a to the first additional connecting link 14a. The first additional input link 12a is also connected to the base B0 via an input joint J0a. The input link 12 is connected to the base link 8 between the output joint J6 and the linking joint J30a.

In FIG. 3a, when the actuating rod 4 is pushed towards the first additional closed kinematic chain La, the first closed kinematic chain L0 will be forced to rotate around the output axis of rotation A6. The first additional input link 12a acts as a lever and is forced to rotate around the input joint J0a by the motion of the actuating rod 4. The first kinematic connection 30a forces the base link 8, and thus also the input joint J0, to rotate around the output axis of rotation A6. At the same time, the first additional connecting link 14a pushes on the input link 12 whereby the input link 12 rotates around input joint J0 and thereby rotates the output link 10 around the output axis of rotation A6. As the input link 12 is connected to the base link 8 with the input joint J0, the rotation of the base link 8 around A6 will increase. In other words, the range of actuation of the input link 12 is amplified to the range of actuation of the output link 10, with the amount of rotation the base link 8 is rotated around the output axis of rotation A6. Of course, the reverse motion is also possible, when the first additional closed kinematic chain La is pulled backwards. Thus, in some embodiments, the first additional connecting link 14a and the first kinematic connection 30a of the first additional closed kinematic chain are connected to the first closed kinematic chain to rotate the base link 8 around the output axis of rotation A6 and to rotate the input link 12 with respect to the base link 8, when the first additional closed kinematic chain La is actuated.

The backhoe linkage mechanism can be designed in a plurality of different ways wherein it has the effect of amplifying the angle of rotation of the output link 10.

In some embodiments, the output link 10 and the input link 12 are arranged to rotate with different amounts relative to the base link 8 of the first closed kinematic chain L0. To achieve this, the first closed kinematic chain L0 is, for example, designed such that a distance between an output axis of rotation A6 of the output joint J6 and an axis of rotation of the connecting joint J10 is smaller than a distance between an axis of rotation of the input joint J0 and the axis of rotation of the bridging joint J14. Thus, as the effective length of the input link 12 is greater than the effective length of the output link 10, the input link 12 can rotate the output link 10, by means of the connecting link 14, to a larger degree than the input link 12 is rotated with respect to the base link 8, during the same motion.

As a further example, the first closed kinematic chain L0 may be designed such that a distance between an axis of rotation of the output joint J6 and an axis of rotation of the input joint J0 is smaller than a distance between an axis of rotation of the connecting joint J10 and the axis of rotation of the bridging joint J14. Thus, as the effective length of the connecting link 14 is greater than the effective length of the base link 8, the input link 12 can rotate the output link 10, by means of the connecting link 14, to a larger degree than the input link 12 is rotated with respect to the base link 8, during the same motion.

Generally, the input link 12 is rotated around the output axis of rotation A6 to a greater extent than the base link 8 is rotated around the same output axis of rotation A6, during the same actuation of the mechanism. This is accomplished as the input link 12 is rotated relative to the base link 8 at the same time as the base link 8 is rotated relative the base B0. The average rotational speed of the input link 12 is thus greater than the average rotational speed of the base link 8, during the same motion. This is made possible as the base link 8 can be rotated by means of the base joint J8, and the first additional closed kinematic chain La is connected to the first closed kinematic chain L0 at two separate pivot points (defined with connecting joint J10a and linking joint J30a), such that the base link 8 (and thus input joint J0) is rotated with respect to the base B0, and the input link 12 is rotated with respect to the base link 8, during the same motion of the mechanism. Thus, the first additional closed kinematic chain La is arranged to rotate the base link 8 and the input link 12 with respect to the base link 8, such that the total angle of rotation of the output link 10 is determined by the combined rotation of the base link 8 and the rotation of the output link 10 relative to the base link 8. In some embodiments, the first additional closed kinematic chain La is arranged to rotate the base link 8, and the input link 12 with respect to the base link 8, with different amounts, such that the total angle of rotation of the output link 10 is determined by the combined rotation of the base link 8 and the rotation of the output link 10 relative to the base link 8.

The connection of the first additional input link 12a to the base B0 via the input joint J0a makes it possible to direct the push or pull motion of the actuating rod 4 in a certain direction. The desired direction is here a rotating motion of the first additional input link 12a around the input joint J0a. The first additional input link 12a has a slightly curved or bent shape, towards the first closed kinematic chain L0. The first kinematic connection 30a is pivotally connected with the joint 30a approximately in the middle of the effective length of the first additional input link 12a, between the joints J0a and J14a, at the largest amplitude of the bend. When the actuating rod 4 is pushed, the first additional input link 12a will be rotated around the input joint J0a, whereby the first additional connecting link 14a will push on the input link 12 and force it to rotate around the input joint J0.

Figure 3B:
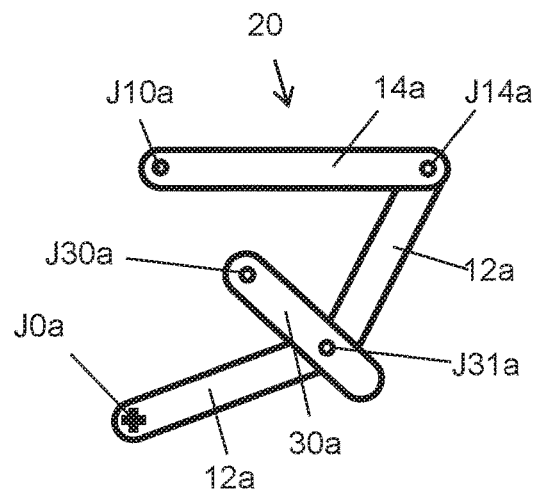
FIG. 3b illustrates the input linkage of FIG. 3a in isolation.

FIG. 3b illustrates added parts of the first additional closed kinematic chain; the added parts are herein referred to as an "input linkage" 20. The input linkage 20 forms, together with part of the input link 12, the base link 8, and the base B0, the first additional closed kinematic chain La. Each additional closed kinematic chain includes such an input linkage.

Returning to FIG. 3a, an actuating rod 4 is connected with a rod joint J4 to the first kinematic connection 30a, for actuation of the backhoe linkage mechanism to rotate the output link 10. However, the actuating rod 4 may alternatively be connected to the backhoe linkage mechanism via another link or joint of the mechanism. The first additional closed kinematic chain La is arranged such that actuation of the first additional closed kinematic chain La amplifies the angle of rotation θ of the output link 10 around the output axis of rotation A6. In more detail, the first additional connecting link 14a and the first kinematic connection 30a are connected to the first closed kinematic chain L0 such that actuation of the first additional closed kinematic chain La amplifies the angle of rotation θ of the output link 10 around the output axis of rotation A6. The input linkage 20 of the first additional closed kinematic chain La is connected to the first closed kinematic chain L0 such that rotation of the first additional input link 12a rotates the base link 8 and the input link 12 in a way such that the output link 10 can rotate more than 360 degrees. The dimensions of the input linkage 20 in this depicted embodiment have been selected such that a vector along base link 8 and from the output axis of rotation A6 to the axis of rotation of the input joint J0 is always kept parallel to a vector along the first additional input link 12a from the axis of rotation of the input joint J0a to a point 25 fixed on the first additional input link 12a. This means there is a virtual link 23 between the input joint J0 and the point 25, which serves as a virtual base link in a four-bar linkage also comprising links 12, 14a, and 12a. This is, for example, accomplished if the distance between the input joint J0a and the linking joint J31a is equal to the distance between the output joint J6 and the linking joint J30a, and the kinematic connection 30a has a length between the linking joint J30a and the linking joint J31a, that is equal to the distance between the output joint J6 and input joint J0a. Thereby, the orientation of the virtual link 23 will become constant during motion. By applying the same principles of dimensioning as explained for the four-bar linkage in FIG. 1, the skilled person can find that the input link 12 will serve as an "output link" of the input linkage 20 with a range of rotation of 360 degrees minus four times α. The base link 8 will, during the same range of motion, rotate 180 degrees minus two times α. This results in a relative range of rotation between the base link 8 and the input link 12 of 180°−2α, which, as shown in FIG. 3a, results in a rotation of the output link 10 by the amount of 360°−4α relative to the base link 8. Combined with the rotation of the base link 8, the total rotation of the output link 10 relative to a fixed reference is then 540°−6α. For the embodiment illustrated in FIG. 3a, the actuating rod 4 has been connected to a first kinematic connection 30a, which, by proper dimensioning according to the mentioned preferred arrangements of the linkage, is prevented from rotating. This makes it possible to connect the components with the use of a standard rod-end for the rod joint J4, even if the linkage is placed on a moving platform, such as a robot wrist.

FIG. 3a also illustrates an embodiment with an alternative arrangement of the first kinematic connection. The alternative arrangement is illustrated with dotted lines. In this embodiment, the base link 8 has been extended further beyond the output joint J6, to provide a connection base for the first kinematic connection. Correspondingly, the first additional input link 12a has been extended further beyond the input joint J0a, to provide a connection base for the first kinematic connection. Thus, the base link 8 and the first additional input link 12a have been extended such that the first kinematic connection, now annotated 30az, can be attached to the extensions with the linking joints J30a and J31a, their new placements illustrated with dotted circles. In this embodiment, the first additional connecting link 14a and the first kinematic connection, now annotated 30az, will be on opposite sides of the base B0, and thus also on opposite sides of the output joint J6. This may be beneficial for some embodiments, where space is limited, to avoid collision between parts of the mechanism. One can observe that this does not affect the above-mentioned relation between the distance from the input joint J0a to the linking joint J31a, and the distance from the output joint J6 to the linking joint J30a, since a corresponding change has been made to both the base link 8 and first additional link 12a, and thus the linkage will have the same kinematic properties.

In some embodiments, the backhoe linkage mechanism is actuated by the rotation of a shaft which is connected to one of the links of the backhoe linkage mechanism.

In some embodiments, the backhoe linkage mechanism is actuated by the rotation of a link pivotally arranged around the same output axis of rotation A6 that the output link 10 is arranged to rotate around.

Figure 4A:
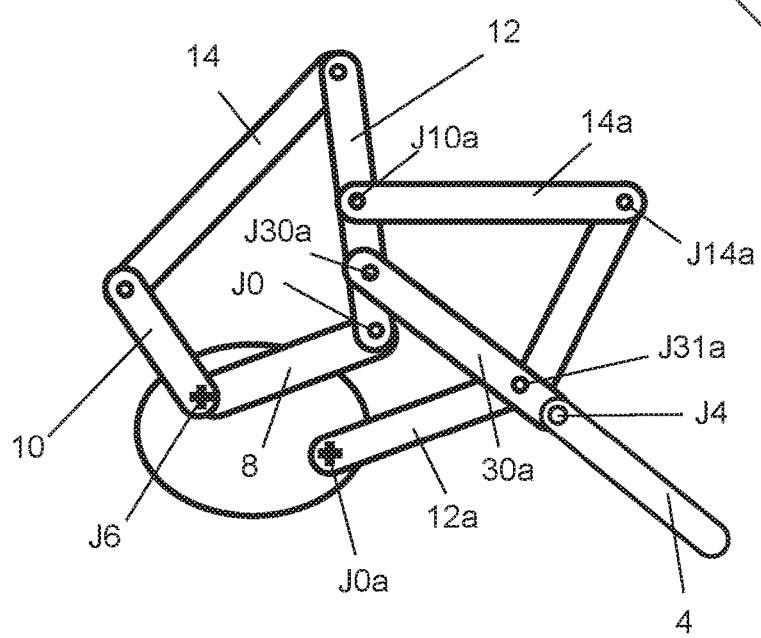
FIG. 4a illustrates a backhoe linkage mechanism according to another embodiment.

FIG. 4a illustrates a backhoe linkage mechanism according to another embodiment, where the first kinematic connection 30a connects to the first closed kinematic chain L0 in an alternative way. Here, the first kinematic connection 30a is connected to the input link 12 via the linking joint J30a. Thus, both the first additional connecting link 14a and the first kinematic connection 30a are connected to the same input link 12. However, the axis of rotation of the linking joint J30a and the axis of rotation of the connecting joint J10a should not coincide for La to function properly.

Figure 4B:
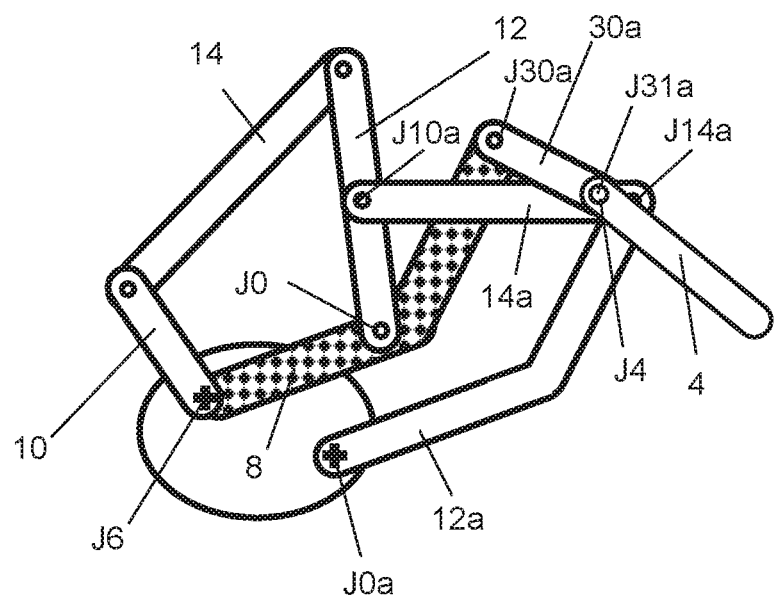
FIG. 4b illustrates a backhoe linkage mechanism according to a further embodiment.

FIG. 4b illustrates a backhoe linkage mechanism according to a further embodiment, where the first kinematic connection 30a is connected between the first closed kinematic chain L0 and the first additional closed kinematic chain La in an alternative way. In comparison with FIG. 4a, the base link 8 has been extended, and has a slightly curved shape. The first kinematic connection 30a is now connected to the base link 8 via the linking joint J30a. The first kinematic connection 30a is also connected to the first additional connecting link 14a via the linking joint J31a. The rod joint J4 and the linking joint J31a are here arranged along the same axis. This arrangement of the kinematic connection may be repeated for any subsequent additional closed kinematic chain.

Figure 5:
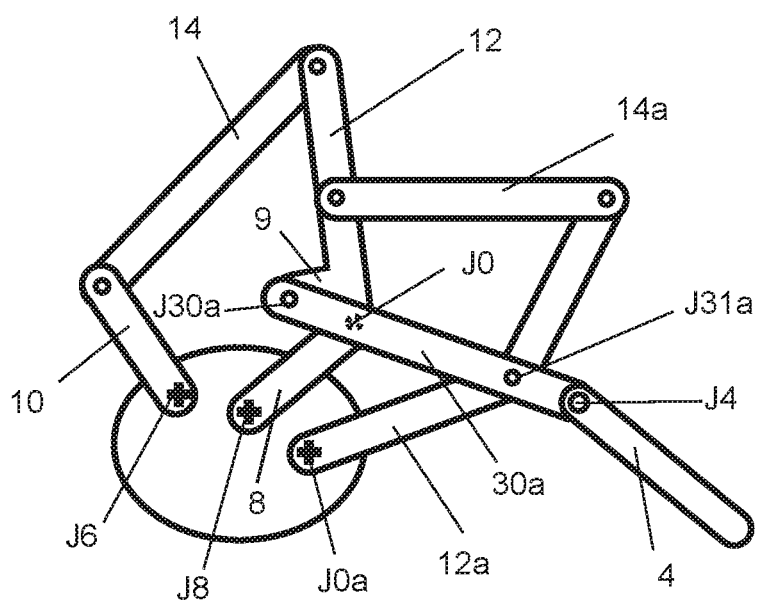
FIG. 5 illustrates a backhoe linkage mechanism according to a still another embodiment.
Figure 6A:
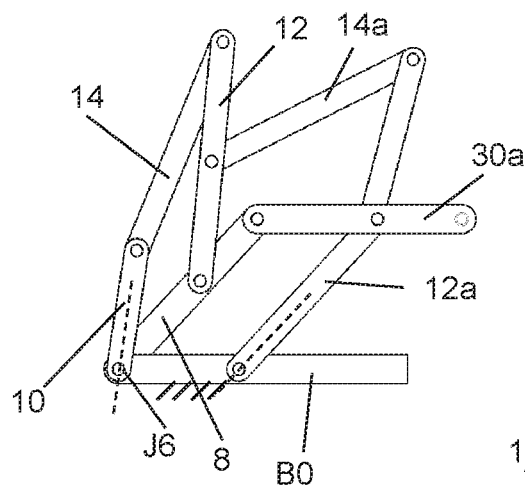
FIGS. 6a-6d illustrate the backhoe linkage mechanism in FIG. 3a, in a plurality of snapshots to visualize the amplification of the angle of rotation of the output link.
Figure 6B:
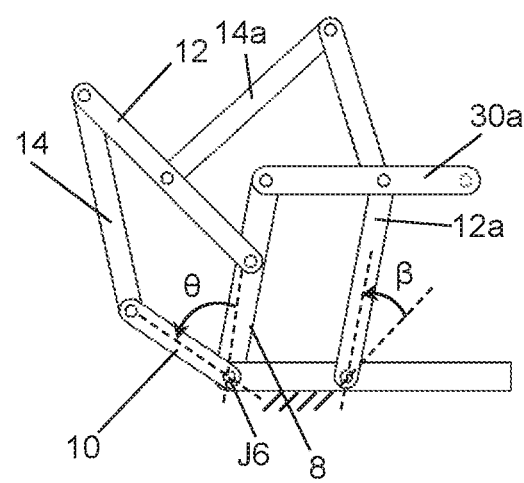
Figure 6C:
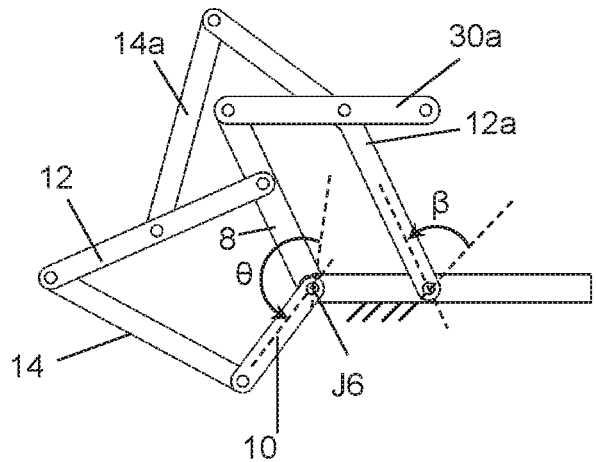
Figure 6D:
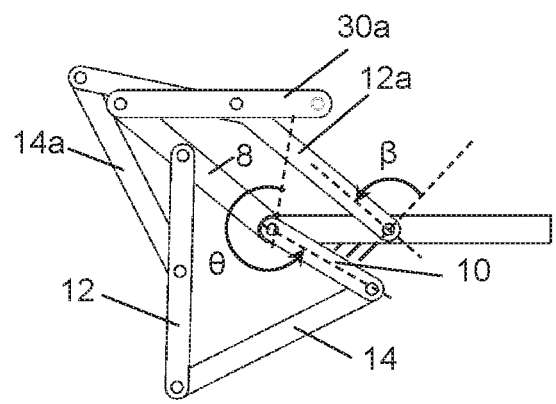

FIG. 5 illustrates a backhoe linkage mechanism according to still another embodiment, where the first kinematic connection 30a connects to the first closed kinematic chain L0 in a further alternative way. Here, the first kinematic connection 30a is connected to a protrusion 9 of the input link 12. The protrusion 9 has a shape of a bulge that extends towards the interior of the first closed kinematic chain L0. Also, the base link 8 is connected with a base joint J8 to the base B0, where the axis of rotation A8 of the base joint J8 does not coincide with the output axis of rotation A6. However, in alternative embodiments, the axis of rotation A8 of the base joint J8 coincides with the output axis of rotation A6. Depending on the location of input joint J0 and linking joint J30a on input link 12, a preferential transmission of motion may be achieved, in particular if the mechanism shall be optimized for certain kinematic and dynamic properties as part of optimizing a surrounding machine implementation.

FIGS. 6a-6d illustrate the backhoe linkage mechanism in FIG. 3a, in a plurality of snapshots in different points in time, to visualize the amplification of the angle of rotation θ of the output link 10, thus the output angle θ. It can here be seen that the output angle θ becomes much greater than the angle of rotation β of the first additional input link 12a, that is the input angle β. Hence, when actuated, the first closed kinematic chain La amplifies the angle of rotation θ of the output link 10 around the output axis of rotation A6, in relation to the input angle β.

Figure 7:
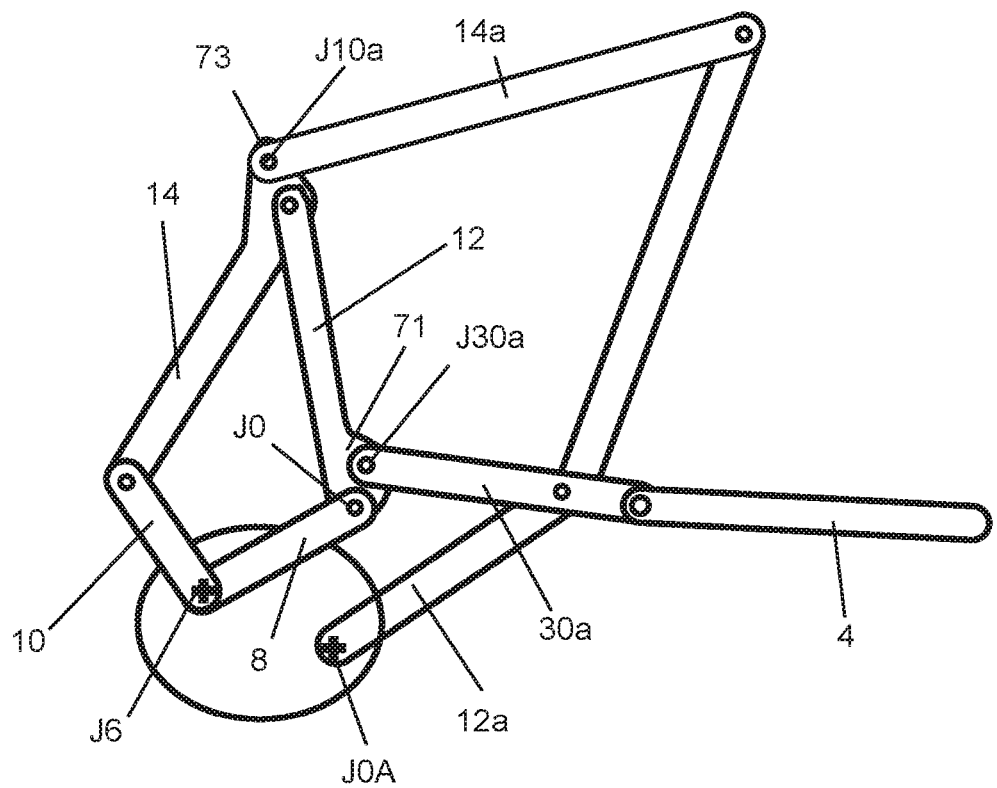
FIG. 7 illustrates a backhoe linkage mechanism according to a still another embodiment.

FIG. 7 illustrates a backhoe linkage mechanism according to another embodiment, where the first additional connecting link 14a is connected to a first protrusion 73 of the connecting link 14, and the first kinematic connection 30a is connected to a second protrusion 71 of the input link 12. The first protrusion 73 on the connecting link 14 is a bulge that extends towards the exterior of the first closed kinematic chain L0. The second protrusion 71 on the input link 12 is a bulge that extends towards the exterior of the first closed kinematic chain L0. This embodiment results in a changed lever on which the first additional connecting link 14a and the connecting link 14 are acting on and thus changing the kinematic relation between the first additional closed kinematic chain La (input) and the first closed kinematic chain L0 (output) which may be favorable for the kinematic relation near the ends of the working range (see description of next figure). Depending on the location of input joint J0 on input link 12, a preferential transmission of motion may be achieved, in particular if the mechanism shall be optimized for certain kinematic and dynamic properties as part of optimizing the surrounding machine.

Figure 8:
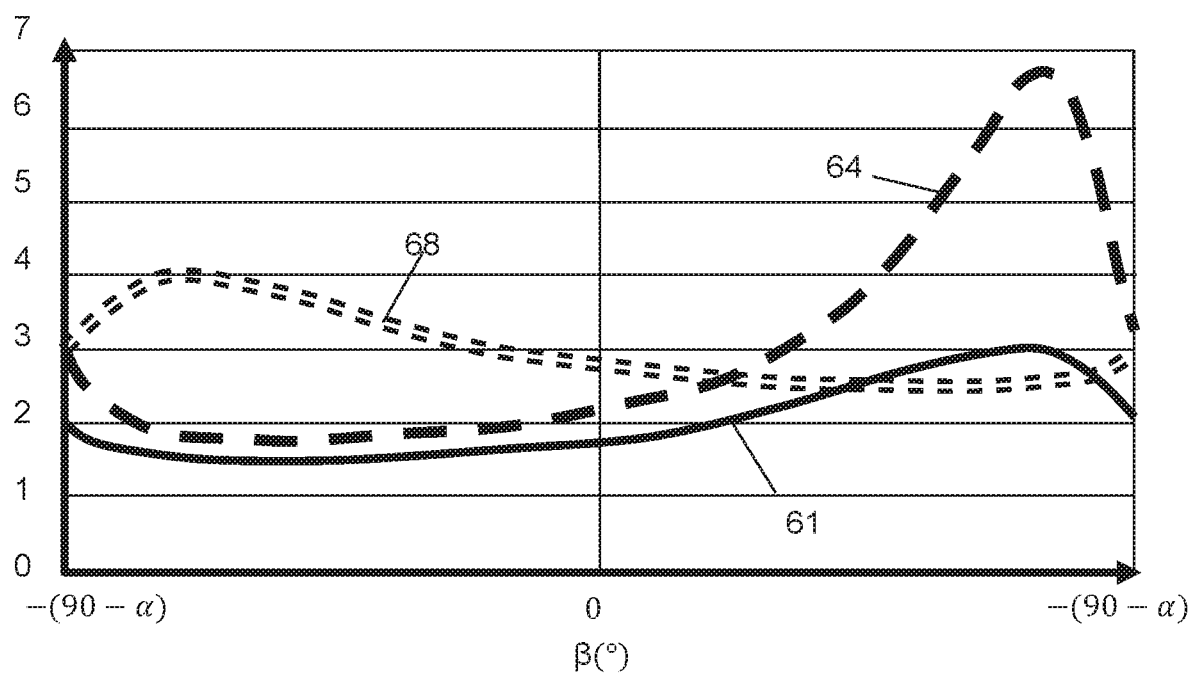
FIG. 8 illustrates the kinematic relation between input angle and output angle.

FIG. 8 is a diagram that illustrates a kinematic relation or function between the input link and the output link of a prior art linkage, and between the input link of the first additional closed kinematic chain La and the output link of the first closed kinematic chain L0 for two different embodiments of the disclosed invention. The vertical axis depicts the ratio of the change of the output angle of rotation θ to the change of angle of rotation β of the input link 12, thus $d\theta/d\beta$. The horizontal axis depicts the input angle of rotation β. The diagram illustrates how the ratio varies during variation of the input angle of rotation β of the input link 12, 12a and 12a. The plotted solid line 61 illustrates the relation for the basic prior art four-bar linkage from FIG. 1. Although the average ratio between the input link 12 and output link 10 for this embodiment is equal to 2, the curve has an asymmetric shape. This asymmetry is amplified for some embodiments when two closed kinematic chains are connected in series, such as for the embodiment of FIG. 3*a* where the kinematic function has a peak of 6.75. The kinematic function for this embodiment is illustrated in FIG. 8 as the dashed line 64. This may be beneficial for some applications, but, in general, it is desirable to have a kinematic curve with minimal variations, since components need to be dimensioned to handle the maximum load. Reducing the peak of the kinematic function from 6.75 to 4 is approximately a 40% reduction, which may reduce the weight of the mechanism by 40% or more.

Figure 9:
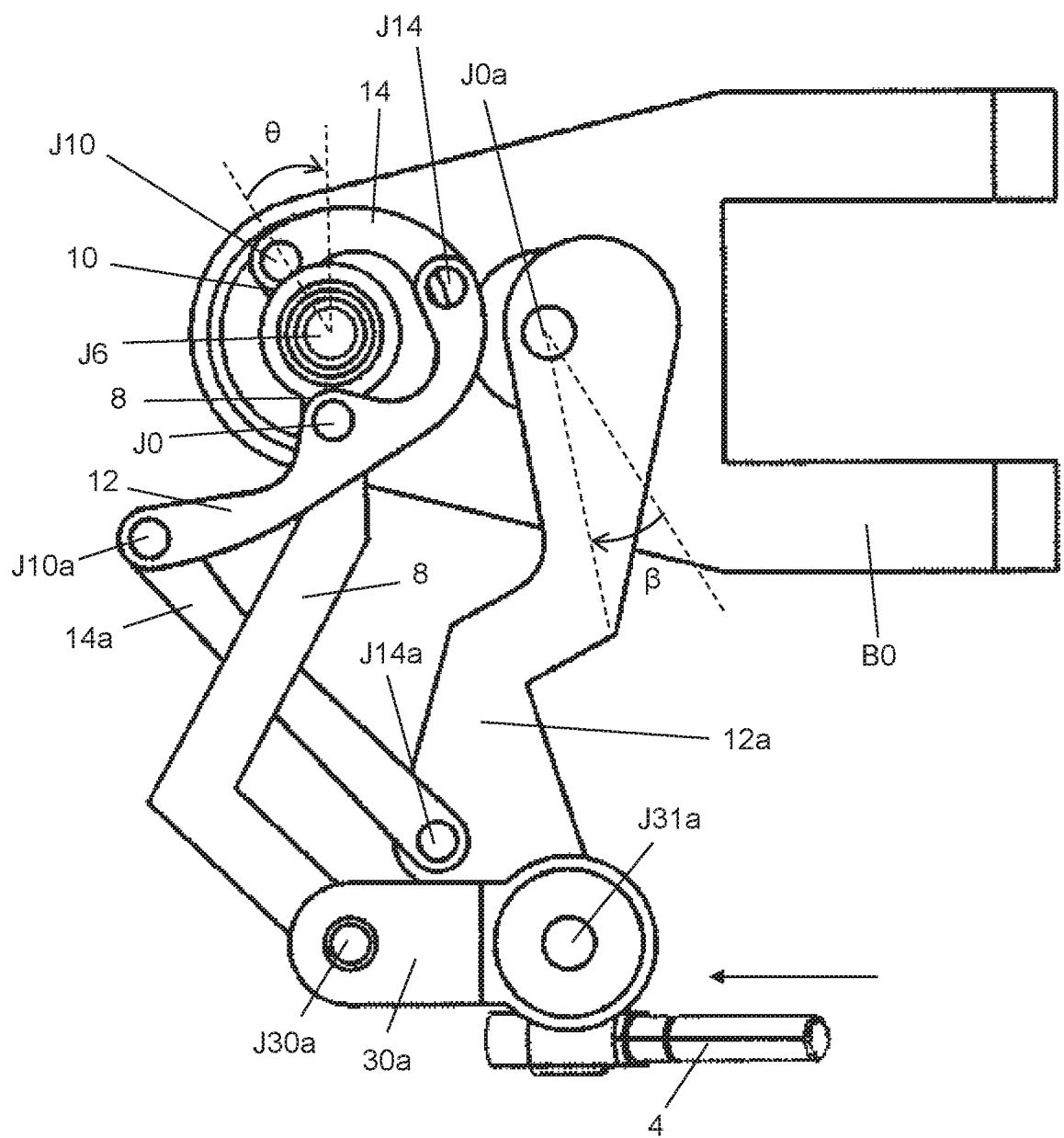
FIG. 9 illustrates a backhoe linkage mechanism according to one embodiment, where the input linkage is arranged with a reversed kinematic structure to the output linkage to generate a smoother kinematic function between input angle and output angle.

FIG. 9 illustrates an embodiment of a backhoe linkage mechanism with reversed kinematic behavior of the first additional closed kinematic chain La. In order to achieve the reversed kinematic behavior, the input link 12 has been extended to the opposite direction where the first additional connecting link 14*a* is pivotally attached in order to reverse the order between the forward and backward positions of the input linkage 20 of the first additional closed kinematic chain La. The input linkage 20 is thus arranged with a reversed kinematic structure to the output linkage to generate a smoother kinematic function between input angle β and output angle θ. The input link 12 has here been extended in the opposite direction with respect to previous illustrations where the first additional connecting link 14*a* is pivotally attached (thus beyond the input joint J0), in order to reverse the order between the forward and backward positions (as explained in FIG. 2*a* and FIG. 2*b*) of the input linkage 20 of the first additional closed kinematic chain La. Because of this, the connecting joint J10*a* is located at the end of the link instead of in the middle as in previous illustrations. This illustration is for a practical implementation of the mechanism, where the physical links have been given curved or bent shapes to ensure that no collision between components will occur during the motion of the mechanism. The links have also been given different thicknesses to provide proper space for bearing components. The kinematic function for this embodiment is illustrated in FIG. 8 as the two dashed lines 68 and has a peak of only 4 compared to a peak of 6.75 for the other illustrated embodiments.

Figure 10:
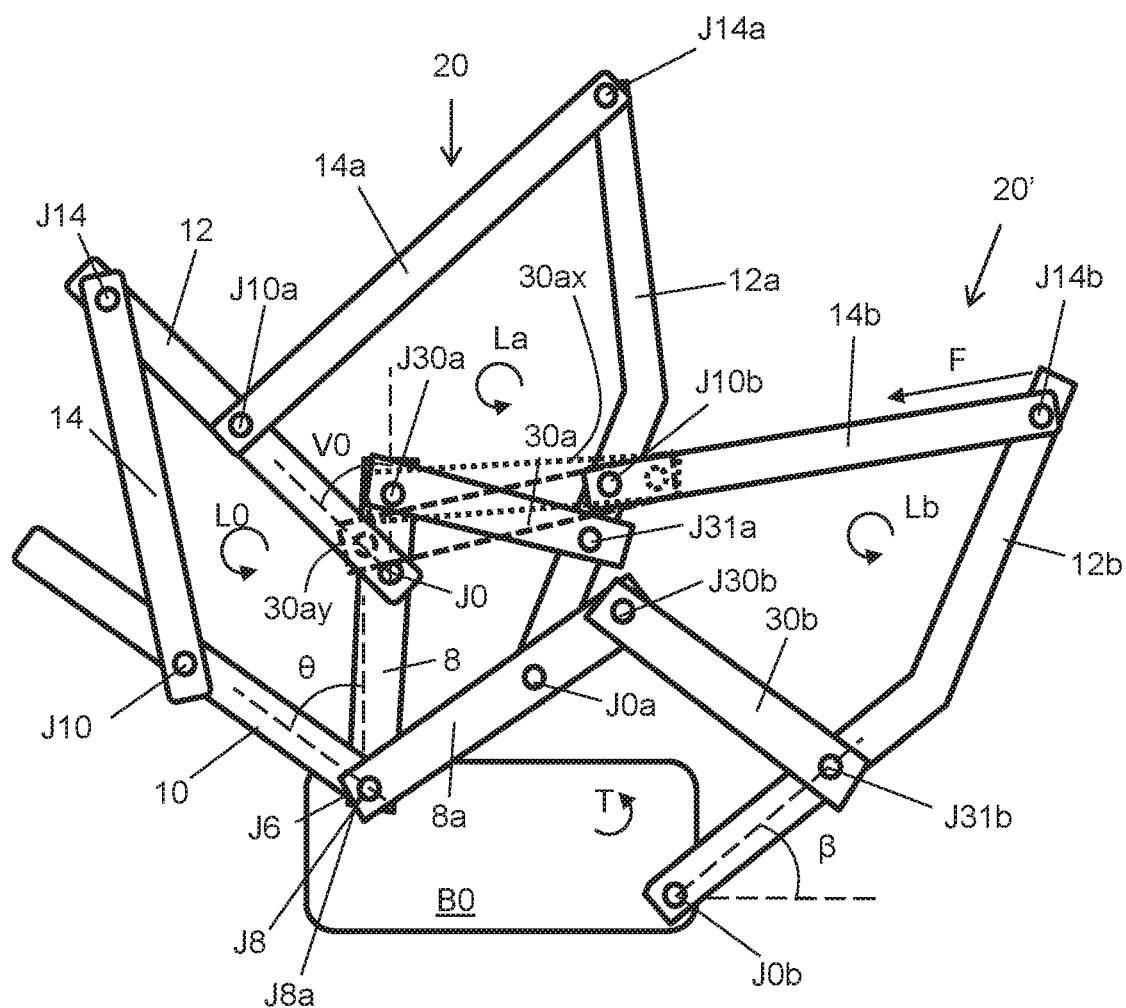
FIG. 10 illustrates a backhoe linkage mechanism according to one embodiment, with two input linkages in series with the output linkage.

FIG. 10 illustrates a backhoe linkage mechanism according to an embodiment with two additional kinematic chains La, Lb connected successively in series after the first closed kinematic chain L0. This backhoe linkage mechanism is based on the embodiment shown in FIG. 3*a*, but additionally comprises a second additional closed kinematic chain Lb. This second additional closed kinematic chain Lb comprises an additional input linkage, thus a second input linkage 20', as illustrated in FIG. 3*b*, that is connected to the first input linkage 20 of the first additional closed kinematic chain La. The input joint J0*a*, that in the embodiment shown in FIG. 3*a* was connected to the base B0, and thus connected the first additional input link 12*a* to the base B0, is now released from the base B0 and is instead connected to a new additional base link. Thus, input joint J0*a* is connected to a first additional base link 8*a*. The input joint J0*a* now becomes a new moveable input joint, that can be moved by actuation of the second additional closed kinematic chain Lb. The first additional base link 8*a* is connected via a base joint J8*a* to the base B0.

In the embodiment in FIG. 10 the axis of rotation of the base joint J8*a* coincides with the output axis of rotation A6. The second input linkage 20', together with at least part of some links of the first additional closed kinematic chain La, defines the second additional closed kinematic chain Lb. The second additional closed kinematic chain Lb includes the base link 8*a* of the first additional closed kinematic chain La and the first additional input link 12*a* of the first additional closed kinematic chain La. The second additional closed kinematic chain Lb also includes a second additional connecting link 14*b* connected to the first additional closed kinematic chain La. The second additional closed kinematic chain Lb also comprises a second additional input link 12*b*, and a second kinematic connection 30*b* between the second additional closed kinematic chain Lb and the first additional closed kinematic chain La. Thus, the first additional closed kinematic chain La includes an additional base link 8*a*. However, the second additional closed kinematic chain Lb, that here is the last additional closed kinematic chain in the series, does not include a new base link. Instead, the second additional input link 12*b* is directly connected to the base B0. Thus, only the last one of the one or more additional closed kinematic chains La, Lb in the series is connected via its additional input link directly to the base B0.

Typically, the last additional closed kinematic chain in a series of successively connected closed kinematic chains does not include a new base link, only the base link of the preceding closed kinematic chain. The second additional connecting link 14*b* and the second kinematic connection 30*b* are connected to the first additional closed kinematic chain La such that actuation of the second additional closed kinematic chain Lb amplifies the angle of rotation of the output link 10 around the output axis of rotation A6. In more detail, the second additional connecting link 14*b* is connected via a connecting joint J10*b* to the first additional input link 12*a*. Alternatively, the second additional connecting link 14*b* is connected via the connecting joint J10*b* to the first additional connecting link 14*a*. The second additional input link 12*b* is connected via a bridging joint J14*b* to the second additional connecting link 14*b*. The first additional base link 8*a* is connected via the input joint J0*a* to the first additional input link 12*a*. Thus, the second input linkage 20' is connected via the second kinematic connection 30*b* to the first additional closed kinematic chain La via the first additional base link 8*a*. The second input linkage 20' is also connected to the first additional closed kinematic chain La via the second additional connecting link 14*b*. The second additional input link 12*b* acts as a lever and is forced to rotate around the input joint J0*b* when actuated, e.g. by the force F of an actuating rod (not shown in FIG. 10). The second kinematic connection 30*b* forces the first additional base link 8*a*, and thus also the input joint J0*a*, to rotate around the output axis of rotation A6. The second additional connecting link 14*b* is rotated by the rotation of the second additional input link 12*b*, whereby both the first additional base link 8*a* (which has a rotating effect on all following links) and the first additional input link 12*a* are rotated by the motion of second additional input link 12*b*. This arrangement (with an additional closed kinematic chain including an input linkage) can be repeated multiple times until the resulting linkage gives the desired range of rotation. For example, in FIG. 12 the arrangement is repeated three times, with three additional closed kinematic chains.

In the illustrated example with solid lines, the kinematic connections 30*a*, 30*b* are arranged between the additional input links 12*a*, 12*b* and the base links 8, 8*a*, respectively. However, many other alternatives are applicable. For example, instead of being connected between the base link 8 and the first additional input link 12*a*, the first kinematic connection 30*a* may be connected between the base link 8 and the first additional connecting link 14*a*. This alternative is illustrated in FIG. 4b. Alternatively, the first kinematic connection may be connected between the base link 8 and the second additional connecting link 14b. This alternative is illustrated in FIG. 10 via a dotted line, and denoted 30ax. The kinematic connection 30ax may then be connected with the linking joint J30a at the same location as before, but the linking joint J31a is now instead moved to the second additional connecting link 14b, as illustrated with the dotted circle on the second additional connecting link 14b. Another option is to connect the first kinematic connection 30a between the input link 12 and the first additional input link 12a, as illustrated in FIGS. 4a, 5 and 7. A still further option is to connect the first kinematic connection 30a between the input link 12 and the second additional connecting link 14b. This alternative is illustrated in FIG. 10 via a hatched line, and denoted 30ay. The kinematic connection 30ay is then connected with the linking joint J30a to the input link 12, and the linking joint J31a is moved to the second additional connecting link 14b, as illustrated with the dotted circle on the second additional connecting link 14b. In a similar way, instead of being connected between the first additional base link 8a and the second additional input link 12b, the second kinematic connection 30b may be connected between the first additional base link 8a and the second additional connecting link 14b. Alternatively, the second kinematic connection 30b may be connected between the first additional base link 8a and a third additional connecting link 14c (not shown in FIG. 10, see e.g. FIG. 12). Another option is to connect the second kinematic connection 30b between the first additional input link 12a and the second additional input link 12b, or between the first additional input link 12a and a third additional connecting link 14c (not shown in FIG. 10, see e.g. FIG. 12). As understood, these alternatives can be applied in subsequent additional closed kinematic chains as well.

In some embodiments, the backhoe linkage mechanism is designed such that a distance between an axis of rotation of the linking joint J30a and an axis of rotation of the additional linking joint J31a (thus the effective length of the first kinematic connection 30a) is shorter than the distance between the axis of rotation of the additional linking joint J31a and an axis of rotation of the bridging joint J14a (thus along the first input link 12a). Thereby the first additional input link 12a may rotate the input link 12 around the input joint J0. Correspondingly, in some embodiments, the backhoe linkage mechanism is designed such that a distance between an axis of rotation of the linking joint J30b and an axis of rotation of the additional linking joint J31b (thus the effective length of the second kinematic connection 30b) is shorter than the distance between the axis of rotation of the additional linking joint J31b and an axis of rotation of the bridging joint J14b (thus along the second input link 12b). Thereby the second additional input link 12b may rotate the first additional input link 12a around the input joint J0a. As understood, these alternatives can be applied to subsequent additional closed kinematic chains as well.

In some embodiments, the backhoe linkage mechanism is designed such that a distance between an axis of rotation of the input joint J0 and an axis of rotation of the connecting joint J10a (thus along the input link 12) is shorter than the distance between an axis of rotation of the additional linking joint J31a and an axis of rotation of the bridging joint J14a (thus along the first additional input link 12a). Thereby the input link 12 will be rotated a greater amount compared to the rotation of the first additional input link 12a. Correspondingly, in some embodiments the backhoe linkage mechanism is designed such that a distance between an axis of rotation of the input joint J0a and an axis of rotation of the connecting joint J10b (thus along the first additional input link 12a) is shorter than the distance between an axis of rotation of the additional linking joint J31b and an axis of rotation of the bridging joint J14b (thus along the second additional input link 12b). Thereby the first additional input link 12a will be rotated a greater amount compared to the rotation of the second additional input link 12b. As understood, these alternatives can be applied to subsequent additional closed kinematic chains as well.

In one embodiment of the backhoe linkage mechanism comprising two additional closed kinematic chains, the distance between the input joint J0 and the connecting joint J10a, the distance between linking joint J30a and the additional linking joint J31a, the distance between the output joint J6 and the input joint J0a, the distance between output joint J6 and inking joint J30a, and the distance between the input joint J0a and the linking joint J30b, are equal. Then, the kinematic gearing will be maximal. If the backhoe linkage mechanism comprises only a first additional closed kinematic chain, then the last distance between the input joint J0a and the linking joint J30b is of course not necessary. If the backhoe linkage mechanism comprises more additional closed kinematic chains, similar distances should also be equal. For example, in some embodiments, if the backhoe linkage mechanism comprises three additional closed kinematic chains such as the embodiment in FIG. 12, the distance between the input joint J0a and the connecting joint J10b, the distance between linking joint J30b and the additional linking joint J31b, the distance between the output joint J6 and the input joint J0b, the distance between output joint J6 and linking joint J30b, and the distance between the input joint J0b and the linking joint J30c, may also be equal. Then, the kinematic gearing will be maximal. However, in some embodiments, only a subset of the above-mentioned distances is equal. For example, in some embodiments, only at least two of the above-mentioned distances are equal. In some embodiments, the distances are substantially equal within a margin, e.g. ±10% of the length of an average of the distances.

Generally, the backhoe linkage mechanism is typically designed such that the connecting link 14 is always non-parallel to the output link 10, to the input link 12, and to the base link 8 during actuation. An angle between connected links, the beforementioned angle $\alpha$, should always be greater than null. For example, the angle $\alpha$ is around 20 degrees, e.g. 20 degrees±5 degrees.

According to one embodiment, during actuation, the angle $\alpha$ should not go below 20 degrees. The actuation should then be stopped when a predetermined minimum angle between connected links is reached. The predetermined minimum angle is for example 20 degrees. According to one embodiment, the backhoe linkage mechanism is designed such that all angles between connected links reach the predetermined minimum angle at the same time. Thereby an optimal gearing between input angle $\beta$ and output angle $\theta$ can be achieved.

According to some embodiments, the one or several closed kinematic chains (La, Lb, Lc) comprises n additional closed kinematic chains, enabling the output link 10 to rotate a total of $(180° - 2\alpha) \cdot (1+n)$ degrees. The angle $\alpha$ is a predetermined minimum angle between connecting links.

Figure 11:
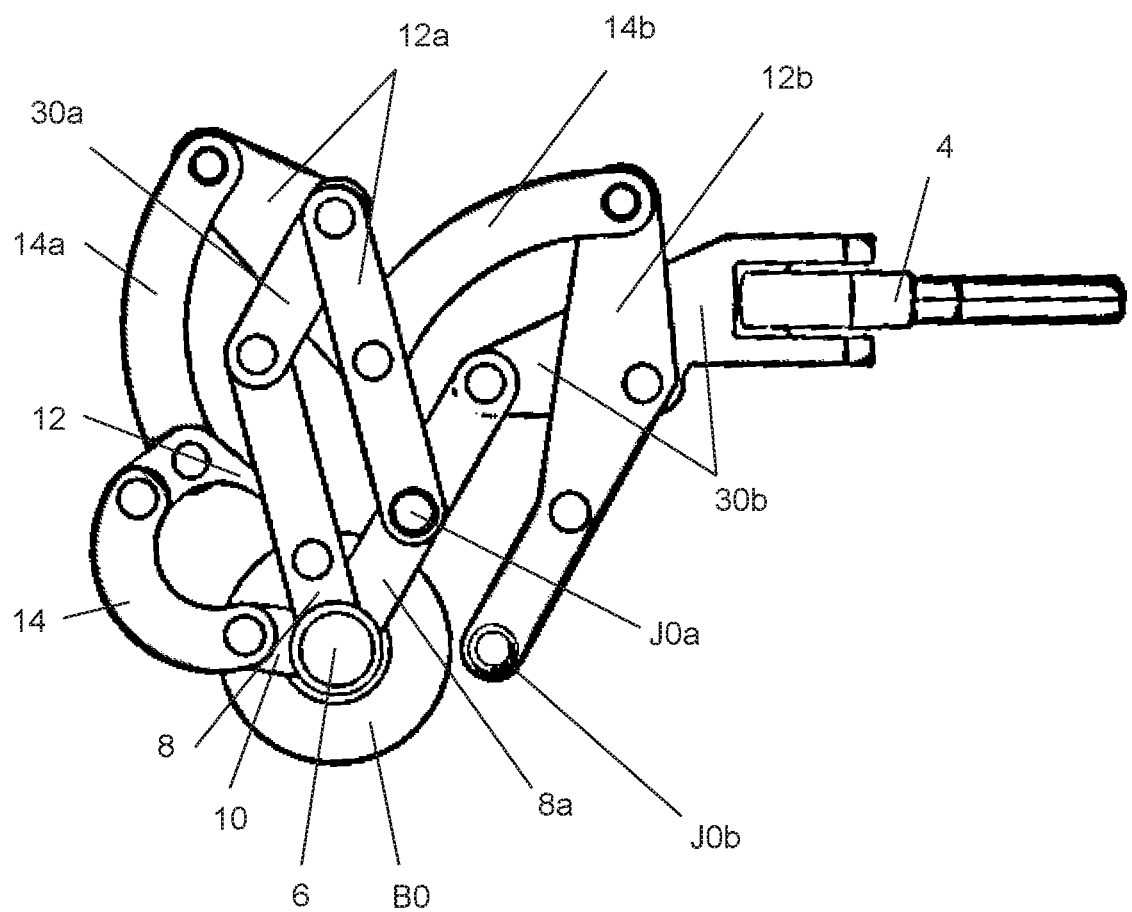
FIG. 11 illustrates a backhoe linkage mechanism according to one embodiment, with two input linkages in series with the output linkage.

FIG. 11 illustrates a backhoe linkage mechanism according to one embodiment, with two input linkages in series with the output linkage. This embodiment has the same structure as the embodiment illustrated in FIG. 9. Thus, the previously fixed input joint J0a is now connected to the first additional base link 8*a*. The first additional base link 8*a* is also pivotally arranged around the output axis of rotation A6. The new second input linkage 20' is connected to the first additional base link 8*a* and the first additional input link 12*a* with the same principle as explained for FIG. 9. This arrangement enables rotations of more than two full turns. The multiple links may overlap each other at some positions for most embodiments of the disclosed invention, while it becomes more obvious for the mechanisms illustrated in FIG. 11 and FIG. 12. To avoid interference that would prevent the mechanism from moving, the links can be stacked in different layers, making it possible to arrange a theoretically unlimited number of closed kinematic chains in a sequence and thus obtain a theoretically unlimited amount of rotation on the output link 10.

Figure 12:
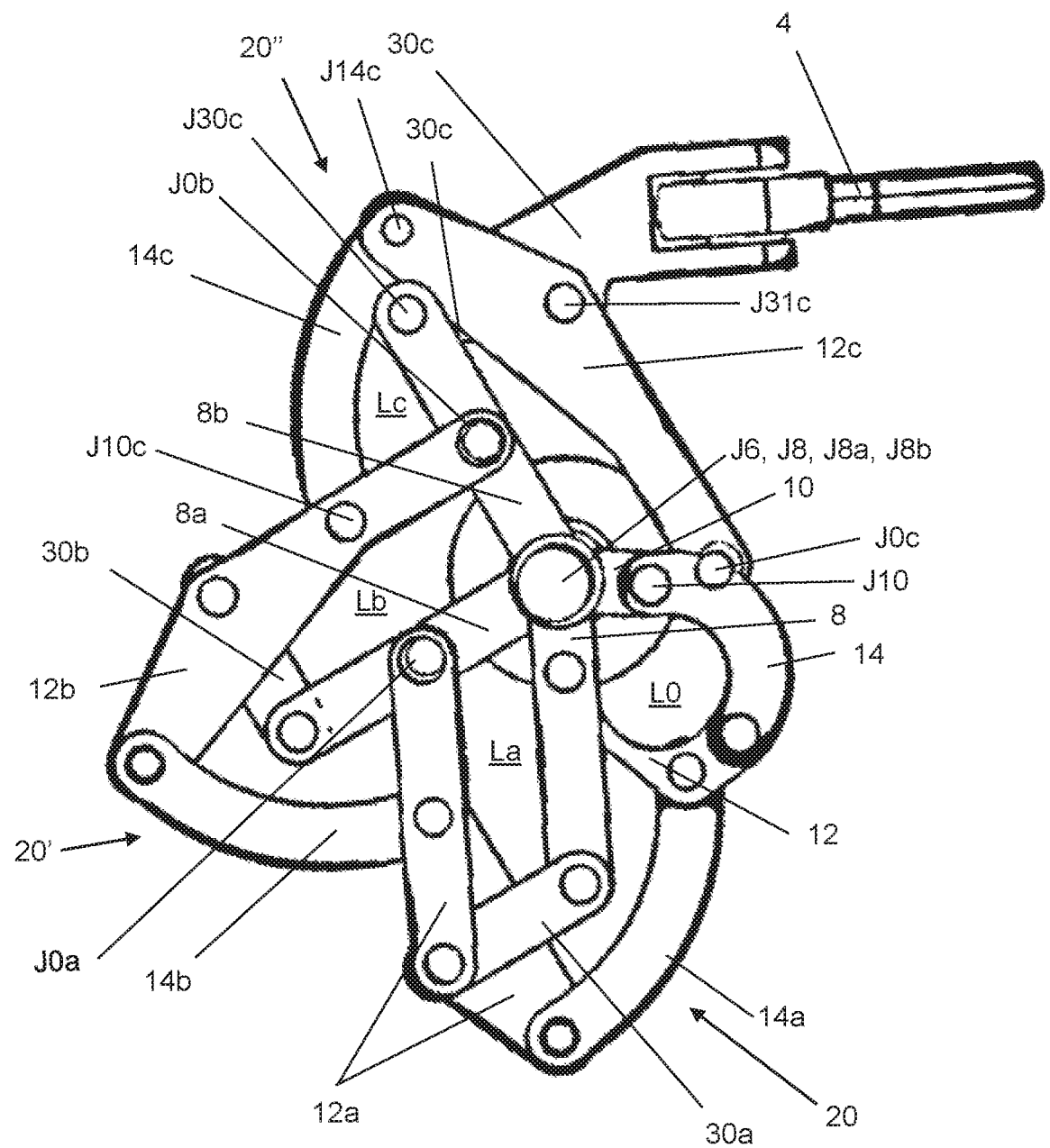
FIG. 12 illustrates a backhoe linkage mechanism according to one embodiment, with three input linkages in series with the output linkage, whereby rotations of more than 720 degrees can be practically achieved.

FIG. 12 illustrates a backhoe linkage mechanism according to one embodiment, with three additional closed kinematic chains La, Lb, Lc in series with the first closed kinematic chain L0, whereby rotations of more than 720 degrees can be practically achieved. This backhoe linkage mechanism is based on the embodiment shown in FIG. 10, but additionally comprises a third additional closed kinematic chain Lc. This third additional closed kinematic chain Lc comprises an additional input linkage, thus a third input linkage 20", as illustrated in FIG. 12, that is connected to the second input linkage 20' of the second additional closed kinematic chain Lb. The input joint J0*b*, that in the embodiment shown in FIG. 10 was connected to the base B0, and thus connected the second additional input link 12*b* to the base B0, is now released from the base B0 and is instead connected to a new additional base link. Thus, the input joint J0*b* is connected to a second additional base link 8*b*. Thereby, the input joint J0*b* now becomes a new moveable input joint, that can be moved by actuation of the third additional closed kinematic chain Lc. The second additional base link 8*b* is connected via a base joint J8*b* to the base B0, and in the embodiment in FIG. 12, the axis of rotation of the base joint J8*b* coincides with the output axis of rotation A6. The third input linkage 20" together with at least part of some links of the second additional closed kinematic chain Lb, defines the third additional closed kinematic chain Lc. The third additional closed kinematic chain Lc comprises the second additional base link 8*b*, the second additional input link 12*b*, a third additional connecting link 14*c* connected to the previous second closed kinematic chain Lb, and a third additional input link 12*c*. The third additional closed kinematic chain Lc also comprises a third kinematic connection 30*c* between the third additional closed kinematic chain Lc and the previous serially connected closed kinematic chain, that is the second additional closed kinematic chain Lb. The third additional connecting link 14*c* and the third kinematic connection 30*c* are connected to the second additional closed kinematic chain Lb such that actuation of the third additional closed kinematic chain Lc amplifies the angle of rotation of the output link 10 around the output axis of rotation A6. The third additional closed kinematic chain Lc is here the last closed kinematic chain in the series. Thus, the third additional closed kinematic chain Lc does not include an additional base link. The third additional closed kinematic chain Lc is connected successively in series after the first closed kinematic chain L0. Thus, it is connected after the previous second additional closed kinematic chain Lb.

In more detail, the third additional connecting link 14*c* is connected via a connecting joint J10*c* to the second additional input link 12*b*. Alternatively, the third additional connecting link 14*c* is connected via the connecting joint J10*c* to the second additional connecting link 14*b*. The third additional input link 12*c* is connected via a bridging joint J14*c* to the third additional connecting link 14*c*. The second additional base link 8*b* is connected via the input joint J0*b* to the second additional input link 12*b*. Thus, the third input linkage 20" is connected via the third kinematic connection 30*c* to the second additional closed kinematic chain Lb via the second additional base link 8*b*. The third input linkage 20" is also connected to the second additional closed kinematic chain Lb via the third additional connecting link 14*c*. The third additional input link 12*c* acts as a lever and is forced to rotate around the input joint J0*c* when actuated. When the third additional connecting link 14*c* is rotated, both the second additional base link 8*b* (which has a rotating effect on all following links) and the second additional input link 12*b* are rotated by the motion of third additional input link 12*c*. It should be understood that the third kinematic connection 30*c* may be connected as described in relation to the description of the first and second kinematic connections 30*a*, 30*b*, but now related to the third additional closed kinematic chain Lc. Thus, instead of being connected between the second additional base link 8*b* and the third additional input link 12*c*, the third kinematic connection 30*c* may be connected between the second additional base link 8*b* and the third additional connecting link 14*c*. Alternatively, the third kinematic connection 30*c* may be connected between the second additional base link 8*b* and a fourth additional connecting link (not shown in FIG. 12). Another option is to connect the third kinematic connection 30*c* between the second additional input link 12*b* and the third additional input link 12*c*, or between the second additional input link 12*b* and a fourth additional connecting link (not shown in FIG. 12).

It should also be understood that previous mentioned relations are correspondingly applicable for the third additional closed kinematic chain Lc. For example, in some embodiments the backhoe linkage mechanism is designed such that a distance between an axis of rotation of the linking joint J30*c* and an axis of rotation of the additional linking joint J31*c* (thus the effective length of the third kinematic connection 30*c*) is shorter than the distance between the axis of rotation of the additional linking joint J31*c* and an axis of rotation of the bridging joint J14*c* (thus along the third additional input link 12*c*). Thereby the third additional input link 12*c* may rotate the second additional input link 12*b* around the input joint J0*b*. In some embodiments, the backhoe linkage mechanism is designed such that a distance between an axis of rotation of the input joint J0*b* and an axis of rotation of the connecting joint J10*c* (that is, along the second additional input link 12*b*) is shorter than the distance between an axis of rotation of the additional linking joint J31*c* and an axis of rotation of the bridging joint J14*c* (thus along the third additional input link 12*c*). Thereby the second additional input link 12*b* will be rotated more than the third additional input link 12*c* is rotated. As understood, these alternatives can be applied to subsequent additional closed kinematic chains as well.

Figure 13:
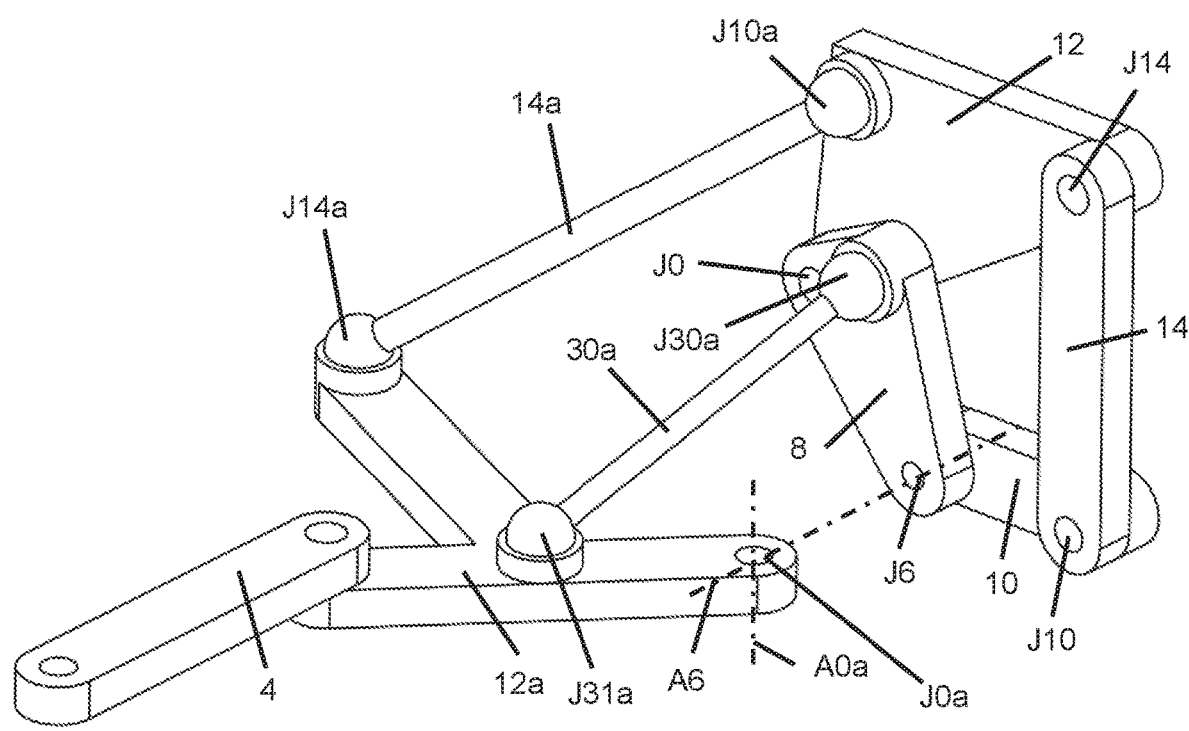
FIG. 13 illustrates a backhoe linkage mechanism according to one embodiment, where the output link and input links are arranged around different axes of rotations.

FIG. 13 illustrates a backhoe linkage mechanism according to another embodiment. In this embodiment, the output link 10 and the first additional input link 12*a* are pivotally arranged to rotate around different axes of rotations A6, A0*a*, respectively. For the illustrated embodiment, the pivot joints J10*a* and J30*a* at the ends of first additional connecting link 14*a* and the first kinematic connection 30*a* are replaced by spherical joints to allow for relative rotations in multiple directions.

Figure 14:
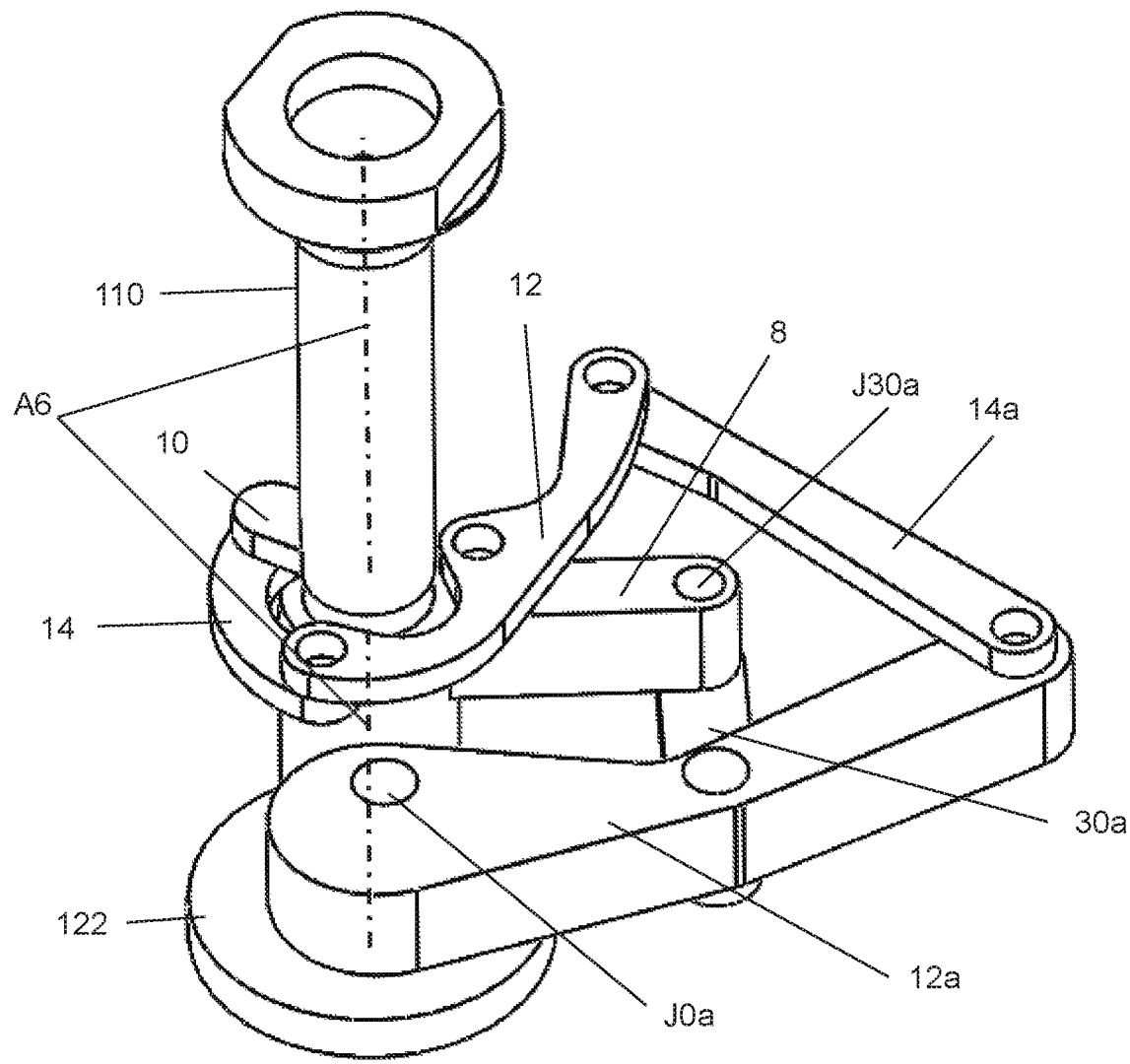
FIG. 14 illustrates a backhoe linkage mechanism according to one embodiment, where the backhoe linkage mechanism is arranged to be actuated by rotating a link pivotally arranged around the axis of rotation for the output link.

FIG. 14 illustrates a backhoe linkage mechanism which is actuated by rotating a shaft pivotally arranged around the same axis of rotation A6 as for the output link 10 and connected to the base link 8. The actuating rod 4 is here replaced by an input shaft 122 and the output link 10 is connected to an output shaft 110. This may be a preferred arrangement for some applications, such as when two concentric shafts need to rotate with different ratios. This embodiment exemplifies one additional way of actuating the linkage via any of the links. The actuating rod may be replaced by a rotating shaft for any embodiment.

The joints described herein may have axes of rotation that are parallel. In one embodiment, all axes of rotation of the backhoe linkage mechanism are parallel. As previously described, the joints may be pivot joints, or alternatively connected by the means of roller bearings, plain bearings or bushings. In some embodiments, the backhoe linkage mechanism comprises a combination of pivot joints and spherical joints. In some embodiments, the backhoe linkage mechanism comprises links that are pivotally arranged to rotate around axes of rotations with different directions.

In some embodiments, the mechanism is built as a planar mechanism using pivot joints. An example where this embodiment may be useful is an application for accomplishing robot wrist motion. However, for other applications, it might be desired to arrange the mechanism such that the axis of rotation A0a of the input link (see FIG. 13) and the output axis of rotation A6 are arranged along different directions, either with constant relative orientation between those two axes, or with the output axis of rotation A6 moved by another mechanism to change the orientation of the axis to achieve a multi-degree of freedom robot wrist motion, where at least one axis is still actuated by a multi-backhoe linkage. In those applications, spherical joints may be used. In general, spherical joints would be used to connect links that are rotating around different axes of rotations, while most other situations most likely will use pivot joints.

The links may be machined from bars, molded or casted in molds, or cut from sheet metal into appropriate forms. The mechanism may be assembled by placing the links in a fixture and connecting the placed links with joints. Thereafter the mechanism is, for example, connected at the output joint J6 to an outgoing axis, that is used for example for rotating a tool.

The herein described embodiments of backhoe linkage mechanisms may be used in a vast number of applications. For example, the mechanism may be incorporated in an apparatus for rotating an output link 10 around an output axis of rotation A6 of an output joint J6 at a base B0. The apparatus then comprises a backhoe linkage mechanism according to any one of the embodiments as described herein, and an actuating mechanism arranged to actuate the backhoe linkage mechanism. The actuating mechanism for example comprises a rod 4, 26 as described herein, connected to a link of the one or more additional closed kinematic chains La, Lb. The backhoe linkage mechanism may be actuated by applying a force F in the direction of the rod 4, 26. The actuator is for example an actuator of a robot. The robot then comprises the apparatus. The accomplished rotation of the output link 10 is, for example, used for orientating a tool of a robot. Typically, the robot is an industrial robot. An industrial robot is an automatically controlled, reprogrammable multipurpose manipulator programmable in three or more axes, which can be either fixed in place or mobile for use in industrial automation applications.

Figure 15:
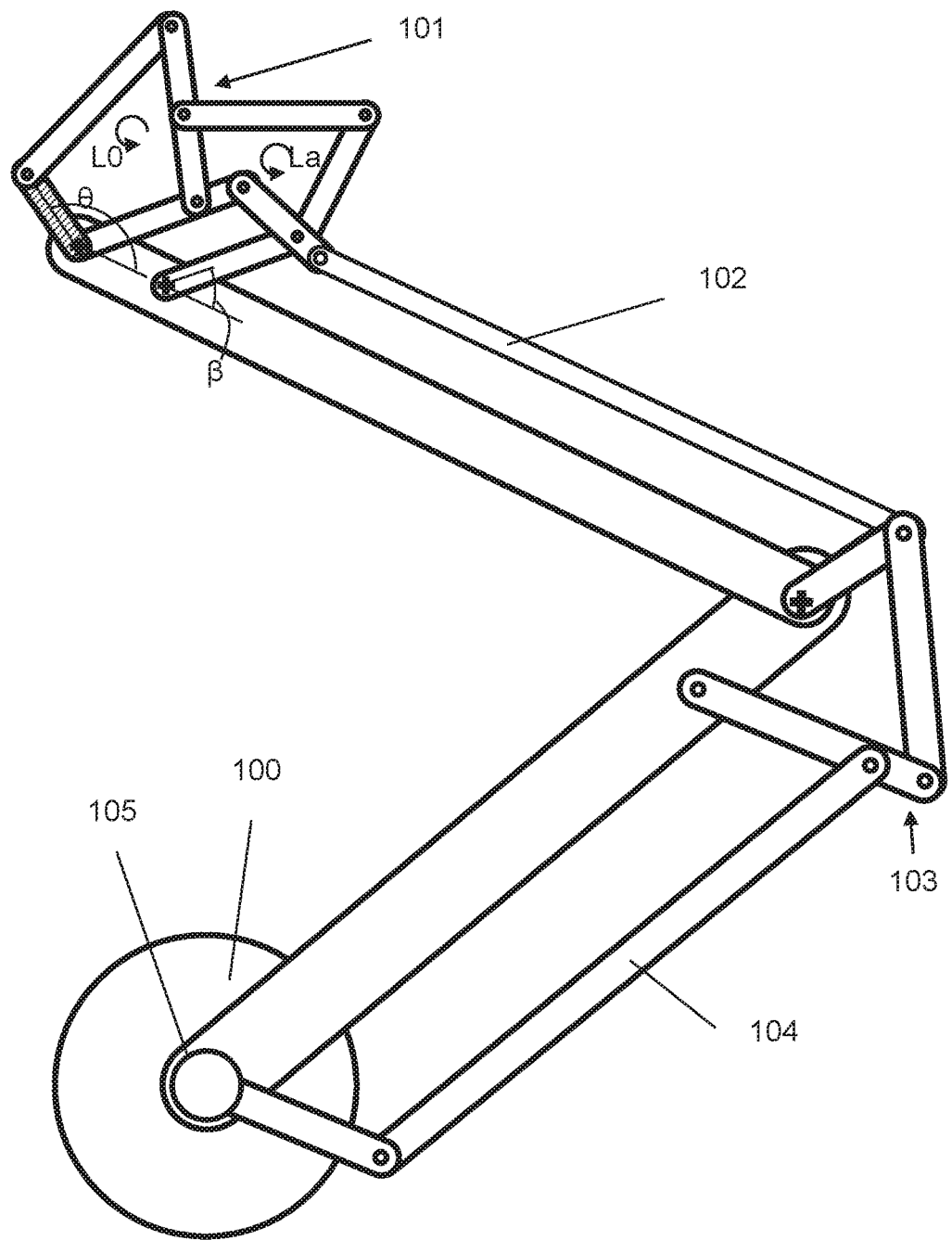
FIG. 15 illustrates an implementation of a backhoe linkage mechanism.

FIG. 15 illustrates a primitive robot arm mounted on a base 100 and equipped with a multi-backhoe linkage mechanism 101 to rotate a tool shaft. The multi-backhoe linkage mechanism is actuated by the actuator 105 located on the base through a first rod 104, a single-backhoe linkage mechanism 103, and a second rod 102. The multi-backhoe linkage mechanism 101 is here the same embodiment as illustrated in FIG. 3a; however, any of the embodiments as presented herein may be used instead.

Figure 16:
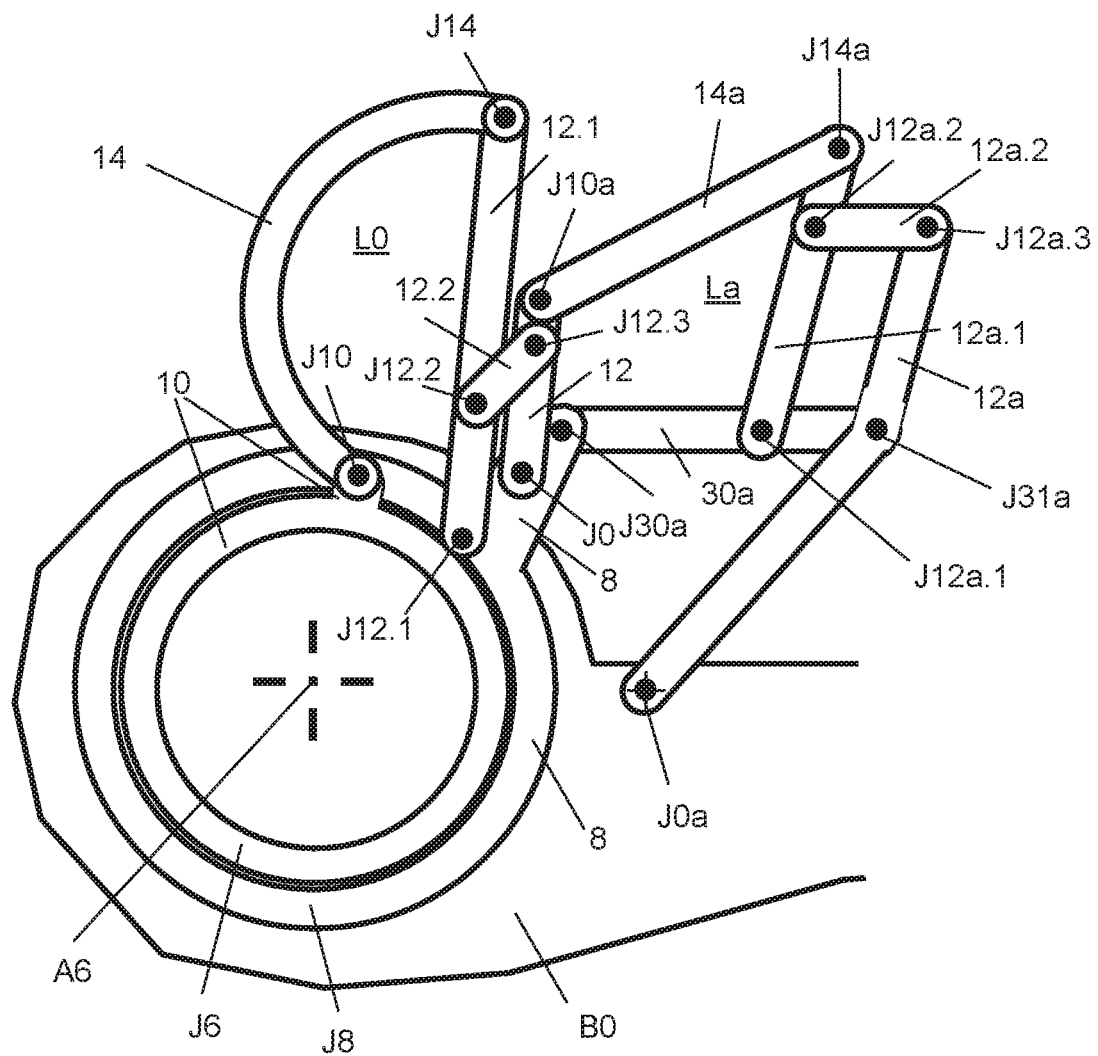
FIG. 16 illustrates a backhoe linkage mechanism according to one embodiment, comprising a large hole through the output link.

FIG. 16 illustrates an embodiment of the multi-backhoe linkage 1 that is configured to provide or give room for a large hollow axis. Such embodiment can for example be used in applications where cables, tubes or pipes needs to be routed through a rotating shaft. As in the other embodiments, the backhoe linkage mechanism of the embodiment of FIG. 16 is arranged for rotating the output link 10 around the output axis of rotation A6 of an output joint J6 at the base B0. In this embodiment, the output link 10 has a more circular shape including a through-going hole. In other words, the output link 10 has a ring-shaped structure. The ring-shaped structure is here continuous, but in other embodiments the ring-shaped structure may have a gap. The output joint J6 has an axis of rotation centered with the output axis of rotation A6. The output joint J6 is formed partly by the ring-shaped structure of the output link 10. The output link 10 also includes a first projecting part. The first projecting part projects from the ring-shaped structure and is used for connecting to a connecting link 14. A connecting joint J10 connects the output link 10 at the first projecting part to the connecting link 14. The base link 8 also has a more circular shape than in the previous embodiments including a through-going hole. In other words, the base link 8 has a ring-shaped structure. The ring-shaped structure is here continuous, but in other embodiments the ring-shaped structure may have a gap. A base joint J8 is formed partly by the ring-shaped structure of the base link 8. The base link 8 includes a second projecting part. The second projecting part projects from the ring-shaped structure, and is used for connecting to other links. The ring-shaped structure of the base link 8 is here arranged on an outer side of the ring-shaped structure of the output link 10. The ring-shaped structures are tightly aligned, but can move in relation to each other. An output shaft (not shown), e.g. a hollow axis, can then be attached to the output link 10, and is arranged, thus accommodated, in the through-going hole of the output link 10 and the through-going hole of the base link 8. In some embodiments, the output shaft is part of the output link 10. In any case, the output shaft is fixedly attached to, or integrated with, the output link 10. The output shaft will then follow the motion of the output link 10. If returning to FIG. 14, such an output shaft may have the same or similar appearance as the output shaft 110. The output shaft may be referred to as a rotating shaft. The output link 10 and the base link 8 are each mounted to the base B0, directly or indirectly, for example with bearings. In some embodiments the bearings are thin section large diameter bearings.

As in the other embodiments, the backhoe linkage mechanism comprises a first closed kinematic chain L0 that includes the output link 10, the connecting link 14, an input link 12 and the base link 8. The first closed kinematic chain L0 however also comprises two more links, thus a first extension input link 12.1 and a second extension input link 12.2. The output link 10 is connected via the output joint J6 to the base B0, e.g. via a bearing. Alternatively, the output link 10 is connected via the output joint J6 to the base link 8, e.g. via a bearing. The output link 10 is also connected via the connecting joint J10 to the connecting link 14, at the first projecting part of the output link 10. The connecting link 14 is further connected via a bridging joint J14 to the input link 12. However, the connecting link 14 is not connected directly to the input link 12, instead, it is connected via the first extension input link 12.1 and a second extension input link 12.2 to the input link 12. The connecting link 14 is thus connected via the bridging joint J14 to the first extension input link 12.1. The first extension input link 12.1 is also connected via a first extension input link joint J12.1 to the base link 8. The second extension link 12.2 is connected via a second extension input link joint J12.2 to the first extension input link 12.1. The second extension link 12.2 is also connected via a third extension input link joint J12.3 to the input link 12. Thus, according to some embodiments, the first kinematic chain comprises a first extension input link 12.1 connected between the connecting link 14 and the base link 8, and a second extension input link 12.2 connected between the first extension input link 12.1 and the input link 12. Thereby the mechanism can be made smaller but with maintained rotational amplification degree. The base link 8 is connected via the base joint J8 to the base B0, e.g. via a bearing. The base joint J8 is formed by the ring-shaped structure of the base link 8. The base joint J8 is pivoting around the center of the ring shape, which may coincide with A6. Alternatively, the base link 8 is connected to the base B0 via the output link 10. The output link 10 is then connected both to the base link 8 and the base B0 via bearings. The base link 8 is further connected via an input joint J0 to the input link 12. Thus, in one embodiment, the mechanism is arranged such that there is one bearing between the output link 10 and the base link 8, and one bearing between the output link 10 and the base B0. In another alternative, the mechanism is arranged such that there is one bearing between the output link 10 and the base link 8, and one bearing between the base link 8 and the base B0. In a further alternative, the mechanism is arranged such that there is one bearing between the output link 10 and the base B0, and one bearing between the base link 8 and the base B0. As mentioned, the bearing may be thin section large diameter bearings.

The backhoe linkage mechanism in FIG. 16 is illustrated with one additional closed kinematic chains La, but may include more additional closed kinematic chains Lb, Lc etc connected successively in a series after the first closed kinematic chain L0. The first additional closed kinematic chain La includes the base link 8 (of the previous closed kinematic chain L0), the input link 12 (of the previous closed kinematic chain L0), a first additional connecting link 14a connected to the previous closed kinematic chain L0, a first additional input link 12a and a first kinematic connection 30a between the first additional closed kinematic chain La and the previous closed kinematic chain L0. The first additional closed kinematic chain La also comprises a first extension additional input link 12a.1 and a second extension additional input link 12a.2. In some embodiments, the first extension additional input link 12a.1 has an arced shape (not shown). The first kinematic connection 30a here comprises a link. The link is connected to the second projection of the base link 8 with a linking joint J30a, and to the first additional input link 12a with an additional linking joint J31a. The input joint J0 is here located along the second projection between the linking joint J30a and the base joint J8. The first additional connecting link 14a is connected via a connecting joint J10a to the input link 12. The first additional connecting link 14a is also connected via a bridging joint 14a to the first additional input link 12a. However, the first additional connecting link 14a is not connected directly to the first additional input link 12a, instead, it is connected indirectly via the first extension additional input link 12a.1 and the second extension additional input link 12a.2 to the first additional input link 12a. The first additional connecting link 14a is thus connected via the bridging joint J14 to the first additional extension input link 12a.1. The first additional extension input link 12a.1 is also connected via a first extension additional input link joint J12a.1 to the first kinematic connection 30a. The second extension additional input link 12a.2 is connected via a second extension additional input link joint J12a.2 to the first extension additional input link 12a.1. The second extension additional input link 12a.2 is also connected via a third extension additional input link joint J12a.3 to the first additional input link 12a. Thus, according to some embodiments, one or more of the additional closed kinematic chains each comprises a first extension additional input link 12a.1, 12b.1 . . . connected between the kinematic connection 30a, 30b, . . . and the connecting link 14a, 14b . . . , and a second extension additional input link 12a.2, 12b.2 . . . connected between the first extension additional input link 12a.1, 12b.1 . . . and the additional input link 12a, 12b . . . . Thereby the mechanism can be made smaller but with maintained rotational amplification degree. Only one additional closed kinematic chain is illustrated in the FIG. 16, but as exemplified in other figures and in the text, the mechanism may include a plurality of additional closed kinematic chains. The references 12b.1 . . . , and 12b.2 . . . refer to links in such additional closed kinematic chains although not illustrated in the figures. The first additional input link 12a is also connected to the base B0 via an input joint J0a. The input link 12 is connected to the base link 8 between the output joint J6 and the linking joint J30a. The first extension additional input link joint J12a.1 is arranged along the first kinematic connection 30a between the linking joint J30a and the additional linking joint J31a. In some embodiments, the effective length of the distance between the second extension additional input link joint J12a.2 and the third extension additional input link joint J12a.3 is the same as the effective length of the distance between the first extension additional input link joint J12a.1 and the additional linking joint J31a. As in the other embodiments, the first additional connecting link 14a and the first kinematic connection 30a are connected to the previous closed kinematic chain L0 such that actuation of the first additional closed kinematic chain La amplifies an angle of rotation of the output link 10 around the output axis of rotation A6.

In the embodiment of FIG. 16, the connecting link 14 has been given an arc shape, such that when the linkage moves, the arc of the connecting link 14 will be located around the output axis J6 while keeping the hollow axis clear. In order for the links in the first additional closed kinematic chain La to not interfere with the clearance desired for the output link 10 or an output shaft, the lengths of the links in the first additional closed kinematic chain La could be given sufficiently large dimensions. However, such solution makes the mechanism take up more space. Instead, the first additional closed kinematic chain La has been placed away, thus, at a distance, from the output axis of rotation A6 which makes it possible to keep the output shaft clear while still keeping the link lengths and space taken up by the mechanism to a minimum. In this way we clear an area around the output axis of rotation A6 and can have a larger output shaft for a specific maximum value for radial stick out (the maximum radial distance from output axis to furthest point away on any link). To make this possible, the connecting link 14 is connected via the bridging joint J14, as well as via the additional links the first extension input link 12.1 and the second extension input link 12.2, to the input link 12 of L0. By adding the first extension input link 12.1 and the second extension input link 12.2, the first additional kinematic chain La can be moved further away from the output axis of rotation A6, as the attachment of the first additional kinematic chain La with the input joint J0 thereby can be moved further away from the output axis of rotation A6. Thereby all links of the first additional kinematic chain La can be kept further away from the output axis of rotation A6. The second extension input link joint J12.2 may be arranged at any location along the second extension input link 12.1, and the third extension input link joint J12.3 may be arranged at any location along the input link 12, as long as they their mutual relationship is kept approximately the same. The input link 12 may be extended such that it projects beyond the connecting joint J10a. The third extension input link joint J12.3 may then be connected to that projection. The first additional connecting link 14a of the first additional kinematic chain La is connected to the first additional input link 12a via a bridging joint J14a, as well as via the additional links the first extension additional input link 12a.1 and the second extension additional input link 12a.2. The addition of the first extension additional input link 12a.1 and the second extension additional input link 12a.2 makes it possible to keep lengths of links of the first additional kinematic chain La down, for example, the lengths of the first additional connecting link 14a and the first additional input link 12a. In other embodiments than the embodiment in FIG. 16, the distance between the output axis of rotation A6 and the input joint J0a has approximately the same length as the distance between the linking joint J30a and the additional linking joint J31a. In the embodiment illustrated in FIG. 16, the distance between the output axis of rotation A6 and the input joint J0a is instead greater than the length of the distance between the linking joint J30a and the additional linking joint J31a. Further, in other embodiments than the embodiment in FIG. 16, the part of the first additional input link 12a extending distally away from the linking joint J31a has a length that is approximately twice the length of the distance between the output axis of rotation A6 and the input joint J0a. In the embodiment illustrated in FIG. 16, the part of the first additional input link 12a extending distally away from the linking joint J31a (thus towards the third extension additional input link joint J12a.3) can be made shorter.

In some embodiments, the distance between the output axis of rotation A6 and the J0, and the distance between the output axis of rotation A6 and the input joint J0a have approximately the same lengths. In the embodiment in FIG. 16, the input joint J0 and the input joint J0a have been moved further away from the output axis of rotation A6. The distances have been designed in relation to the size of the output shaft, such that no links of the mechanism will move into the area of the output shaft, and such that desired exchange ratio is obtained. If for example the input joint J0a was not moved distally away from the output axis of rotation A6 (in relation to other embodiments), the first additional input link 12a might go into the area of the output shaft when the mechanism is actuated.

The relations and distances described in relation to other embodiments than that disclosed in FIG. 16, are also applicable for the embodiment of FIG. 16, but in some cases modified for practical reasons.

For example, in some embodiments of the mechanism in FIG. 16, the distance between the axis of rotation of the output joint J6 and the axis of rotation of the connecting joint J10 is smaller than a distance between the axis of rotation of the first extension input link joint J12.1 and the axis of rotation of the bridging joint J14. In some example embodiments of the backhoe linkage mechanism in FIG. 16, the mechanism is designed such that a distance between an axis of rotation of the linking joint J30a and an axis of rotation of the first extension additional input link joint J12a.1 (thus along the first kinematic connection 30a) is shorter than the distance between the axis of rotation of the first extension additional input link joint J12a.1 and the axis of rotation of the bridging joint J14a (thus along the first extension additional input link 12a.1. Thereby the first extension additional input link joint 12a.1 may rotate the input link 12 around the input joint J0. As understood, these alternatives can be applied to subsequent additional closed kinematic chains as well. In some embodiments, the backhoe linkage mechanism of FIG. 16 is designed such that a distance between an axis of rotation of the input joint J0 and an axis of rotation of the connecting joint J10a (thus along the input link 12) is shorter than the distance between an axis of rotation of the first extension additional input link joint J12a.1 and an axis of rotation of the bridging joint J14a (thus along the first extension additional input link 12a.1. Thereby the input link 12 will be rotated a greater amount compared to the rotation of the first extension additional input link 12a.1. In some embodiments, the distance between the additional linking joint J31a and the bridging joint J14a is greater that the distance between the input joint J0 and the connecting joint J10a. Thus, the effective length of the first extension additional input link 12a.1 is of importance. In some embodiments, the distance between the connecting joint J10a and the bridging joint J14a (thus effective length of first additional connecting link 14a) is greater that the distance between the input joint J0 and the connecting joint J10a. As understood, any of these alternatives can be applied to subsequent additional closed kinematic chains as well.

The embodiment in FIG. 16 shows one of many possible options for how additional links and joints can be added to the mechanism to optimize shape or function for a specific application. The embodiment may be combined with any of the herein illustrated embodiments. As understood, the embodiment may also include more additional closed kinematic chains, that have similar configuration as the first additional closed kinematic chain.

LIST OF REFERENCES

1: four bar linkage (prior art)
4: actuating rod
8: base link
8a: first additional base link
8b: second additional base link
9: protrusion
10: output link
12: input link
12.1: first extension input link
12.2: second extension input link
12a: first additional input link
12a.1: first extension additional input link
12a.2: second extension additional input link
12b: second additional input link
12c: third additional connecting link
14: connecting link
14a: first additional connecting link
14b: second additional connecting link
14c: third additional connecting link
20: first input linkage of the first additional closed kinematic chain 20': second input linkage of the second additional closed kinematic chain
20": third input linkage of the third additional closed kinematic chain
23: virtual link 23 between the input joint J0 and point 25
25: a point fixed on the first additional input link 12a
30a: a first kinematic connection
30ax: first kinematic connection alternatively connected
30ay: first kinematic connection alternatively connected
30az: first kinematic connection alternatively connected
30b: a second kinematic connection
30c: a third kinematic connection
41: angle between the output link 10 and connecting link 14 in a most backward position
43: angle between the input link 12 and connecting link 14 in a most backward position
45: angle between the output link 10 and base link 8 in a most backward position
47: angle between the input link 12 and the base link 8 in a most forward position
49: angle between the output link 10 and the connecting link 14 in a most forward position
51: angle between the input link 12 and connecting link 14 in a most forward position
53: maximum rotation angle of the input link 12 from its most backward position to its most forward position
55: maximum rotation angle of the output link 10 from its most backward position to its most forward position
61: a plotted solid line that illustrates the relation $d\theta/d\beta$ for the basic prior art four-bar linkage in FIG. 1.
64: a dashed line that illustrates the relation $d\theta/d\beta$ for the embodiment in FIG. 3a.
68: two dashed lines that illustrates the relation $d\theta/d\beta$ for the embodiment in FIG. 10.
71: protrusion on input link 12
73: protrusion on connecting link 14
100: a base
101: multi-backhoe mechanism
102: second rod
103: single-backhoe mechanism
104: first rod
105: actuator
110: output shaft
122: input shaft
A6: output axis of rotation of output joint J6; output axis
A8: axis of rotation of joint J8
B: base of prior art
B0: base
J0: input joint connecting the input link 12 to the base B0 or to the base link 8
J0a: input joint connecting the first additional input link 12a to the base B0 or to the first additional base link 8a
J0b: input joint connecting the second additional input link 12b to the base B0 or to the second additional base link 8b
J0c: input joint connecting the third additional input link 12c to the base B0 or to a third additional base link (not shown)
J4: rod joint connecting actuating rod 4 to kinematic connection link 30a or any other link of the at least on additional closed kinematic chains
J6: output joint defining the axis of rotation A6
J8: base joint connecting the base link to the base B0
J8a: base joint connecting the first additional base link to the base B0
J8b: base joint connecting the second additional base link to the base B0
J10: connecting joint connecting the output link 10 to the connecting link 14
J10a: a connecting joint connecting the first additional connecting link 14a to the first closed kinematic chain L0
J10b: a connecting joint connecting the second additional connecting link 14b to the first additional closed kinematic chain La
J10c: a connecting joint connecting the third additional connecting link 14c to the second additional closed kinematic chain Lb
J12.1: first extension input link joint
J12.2: second extension input link joint
J12.3: third extension input link joint
J12a.1: first extension additional input link joint
J12a.2: second extension additional input link joint
J12a.3: third extension additional input link joint
J14: a bridging joint connecting the connecting link 14 to the input link 12
J14a: a bridging joint connecting the first additional connecting link 14a to the first additional input link 12a
J14b: a bridging joint connecting the second additional connecting link 14b to the second additional input link 12b
J14c: a bridging joint connecting the third additional connecting link 14c to the third additional input link 12c
J30a: a linking joint connecting the first kinematic connection 30a to the output linkage of the first closed kinematic chain L0
J30b: a linking joint connecting the second kinematic connection 30b to the input linkage 20 of the first additional closed kinematic chain La
J30c: a linking joint connecting the third kinematic connection 30c to the input linkage 20' of the second additional closed kinematic chain Lb
J31a: an additional linking joint connecting the first kinematic connection 30a to the input linkage 20 of the first additional closed kinematic chain La
J31b: an additional linking joint connecting the second kinematic connection 30b to the input linkage 20' of the second additional closed kinematic chain Lb
J31c: an additional linking joint connecting the third kinematic connection 30c to the input linkage 20" of the third additional closed kinematic chain Lc
L0: first closed kinematic chain
La: first additional closed kinematic chain
Lb: second additional closed kinematic chain
Lc: third additional closed kinematic chains
α: a minimum angle
β: input angle, an angle of rotation of the last input link
θ: output angle, a corresponding angle of rotation of the output link 10

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A backhoe linkage mechanism for rotating an output link around an output axis of rotation of an output joint at a base, the backhoe linkage mechanism comprising:
a first closed kinematic chain that includes the output link, a connecting link, and an input link;
wherein the output link is connected via the output joint to the base, and is connected via a connecting joint to the connecting link;
wherein the connecting link is connected via a bridging joint to the input link;

wherein the first closed kinematic chain additionally includes a base link that is connected via a base joint to the base, and that is connected via an input joint to the input link;

wherein the backhoe linkage mechanism further comprises one or more additional closed kinematic chains connected successively in a series after the first closed kinematic chain, each additional closed kinematic chain including:

the base link of a previous closed kinematic chain;
the input link of the previous closed kinematic chain;
an additional connecting link connected to the previous closed kinematic chain;
an additional input link; and
a kinematic connection between the closed kinematic chain and the previous closed kinematic chain;

wherein the additional connecting link and the kinematic connection are connected to the previous closed kinematic chain such that actuation of the additional closed kinematic chain amplifies an angle of rotation of the output link around the output axis of rotation.

2. A backhoe linkage mechanism according to claim 1, wherein each additional closed kinematic chain includes an additional base link, except for a last additional closed kinematic chain in the series.

3. A backhoe linkage mechanism according to claim 2, wherein the additional base link is connected via an additional input joint to the additional input link of the same additional closed kinematic chain, and via an additional base joint to the base.

4. A backhoe linkage mechanism according to claim 1, wherein the additional connecting link and the kinematic connection of the same additional closed kinematic chain are connected to the previous closed kinematic chain to rotate the base link around the output axis of rotation and to rotate the input link with respect to the base link of the previous closed kinematic chain.

5. A backhoe linkage mechanism according to claim 1, wherein the one or more additional closed kinematic chains are arranged to rotate the base link and the input link with respect to the base link such that the total angel of rotation of the output link is determined by the combined rotation of the base link and the rotation of the output link relative the base link.

6. A backhoe linkage mechanism according to claim 1, wherein the kinematic connection comprises a kinematic connection link.

7. A backhoe linkage mechanism according to claim 6, wherein the kinematic connection link of the kinematic connection is connected via linking joints to the respective links.

8. A backhoe linkage mechanism according to claim 7, wherein a distance between an axis of rotation of the linking joints connecting the kinematic connection to the previous closed kinematic chain and an axis of rotation of the additional linking joint connecting the kinematic connection to the additional closed kinematic chain is shorter than the distance between the axis of rotation of the additional linking joint connecting the kinematic connection to the additional closed kinematic chain and an axis of rotation of the bridging joint connecting the additional connecting link to the additional input link of the same additional closed kinematic chain.

9. A backhoe linkage mechanism according to claim 8, wherein a distance between an axis of rotation of the input joint that connects the input link to one of the base and the base link and an axis of rotation of the connecting joint that connects the input link to the connecting link is shorter than the distance between an axis of rotation of the additional linking joint connecting the kinematic connection to the additional closed kinematic chain and an axis of rotation of the bridging joint that connects the connecting link to the input link of the same additional closed kinematic chain.

10. A backhoe linkage mechanism according to claim 1, wherein the kinematic connection is arranged between the base link of the previous serially connected closed kinematic chain and one of the input links, the additional connecting link, and the additional connecting link of the subsequent serially connected closed kinematic chain.

11. A backhoe linkage mechanism according to claim 1, wherein the kinematic connection is arranged between the input link of the previous serially connected kinematic chain and one of the input links and the additional connecting link of the subsequent serially connected closed kinematic chain.

12. A backhoe linkage mechanism according to claim 1, wherein at least one of the input links of the one or more additional closed kinematic chains is connected via an additional input joint to the base.

13. A backhoe linkage mechanism according to claim 12, wherein the input link of the last one of the one or more additional closed kinematic chains in the series is connected via the additional input joint to the base.

14. A backhoe linkage mechanism according to claim 1, wherein the base joint that connects the base link to the base has an axis of rotation that coincides with the output axis of rotation.

15. A backhoe linkage mechanism according to claim 1, wherein all axes of rotation of the joints are parallel.

16. A backhoe linkage mechanism according to claim 1, wherein a distance between an axis of rotation of the output joint and an axis of rotation of the connecting joint that connects the output link or input link to the connecting link is smaller than a distance between an axis of rotation of the input joint that connects the input link to one of the base and the base link, and the axis of rotation of the bridging joint that connects the connecting link to the input link of the same closed kinematic chain.

17. A backhoe linkage mechanism according to claim 1, wherein, for each additional closed kinematic chain:

the additional connecting link is connected via an additional connecting joint to one of the input links and the connecting link of the previous closed kinematic chain; and the additional input link is connected via an additional bridging joint to the additional connecting link.

18. A backhoe linkage mechanism according to claim 1, wherein the output link and the input link of the first closed kinematic chain are arranged to rotate relative to the base link of the first closed kinematic chain.

19. An apparatus for rotating an output link around an output axis of rotation of an output joint at a base, the apparatus comprising a backhoe linkage mechanism that comprises a first closed kinematic chain that includes the output link, a connecting link, and an input link, wherein:

the output link is connected via the output joint to the base and is connected via a connecting joint to the connecting link; and wherein the connecting link is connected via a bridging joint to the input link; and wherein the first closed kinematic chain further includes a base link connected via a base joint to the base, and connected via an input joint to the input link;

wherein the backhoe linkage mechanism further comprises one or more additional closed kinematic chains connected successively in a series after the first closed kinematic chain, each additional closed kinematic chain including:

the base link of a previous closed kinematic chain;
the input link of the previous closed kinematic chain;
an additional connecting link connected to the previous closed kinematic chain;
an additional input link; and
a kinematic connection between the closed kinematic chain and the previous closed kinematic chain;
wherein the additional connecting link and the kinematic connection are connected to the previous closed kinematic chain such that actuation of the additional closed kinematic chain amplifies an angle of rotation of the output link around the output axis of rotation;

and wherein the apparatus further comprises an actuating mechanism arranged to actuate the backhoe linkage mechanism.

20. The apparatus according to claim 19, wherein the actuating mechanism comprises a rod connected to a link of the one or more additional closed kinematic chains, wherein the backhoe linkage mechanism is arranged to be actuated by a force F in the direction of the rod.

21. A robot comprising an apparatus for rotating an output link around an output axis of rotation of an output joint at a base, the apparatus comprising:

a backhoe linkage mechanism comprising:
a first closed kinematic chain that comprises the output link, a connecting link, and an input link;
wherein the output link is connected via the output joint to the base, and is connected via a connecting joint to the connecting link; and
wherein the connecting link is connected via a bridging joint to the input link; and
wherein the first closed kinematic chain further includes a base link connected via a base joint to the base, and connected via an input joint to the input link;
wherein the backhoe linkage mechanism further comprises one or more additional closed kinematic chains connected successively in a series after the first closed kinematic chain, each additional closed kinematic chain including:
the base link of a previous closed kinematic chain;
the input link of the previous closed kinematic chain;
an additional connecting link connected to the previous closed kinematic chain;
an additional input link; and
a kinematic connection between the closed kinematic chain and the previous closed kinematic chain;
wherein the additional connecting link and the kinematic connection are connected to the previous closed kinematic chain such that actuation of the additional closed kinematic chain amplifies an angle of rotation of the output link around the output axis of rotation;
wherein the apparatus further comprises an actuating mechanism arranged to actuate the backhoe linkage mechanism, and wherein the rotation of the output link is used for orientating a tool of the robot.

* * * * *